(12) United States Patent
Schwarz et al.

(10) Patent No.: US 10,911,601 B2
(45) Date of Patent: Feb. 2, 2021

(54) OBJECT ORIENTED CALL MANAGEMENT

(71) Applicant: Microsoft Technology Licensing, LLC, Redmond, WA (US)

(72) Inventors: Scott A. Schwarz, Seattle, WA (US); Waseem W Hashem, Vacouver (CA)

(73) Assignee: Microsoft Technology Licensing, LLC, Redmond, WA (US)

( * ) Notice: Subject to any disclaimer, the term of this patent is extended or adjusted under 35 U.S.C. 154(b) by 114 days.

(21) Appl. No.: 16/210,462

(22) Filed: Dec. 5, 2018

(65) Prior Publication Data

US 2020/0186648 A1    Jun. 11, 2020

(51) Int. Cl.
| | |
|---|---|
| *H04M 3/00* | (2006.01) |
| *H04M 3/51* | (2006.01) |
| *G06F 3/0482* | (2013.01) |
| *G06F 3/0486* | (2013.01) |
| *H04L 12/58* | (2006.01) |

(52) U.S. Cl.
CPC ........ *H04M 3/5183* (2013.01); *G06F 3/0482* (2013.01); *G06F 3/0486* (2013.01); *H04L 51/046* (2013.01); *H04L 51/16* (2013.01); *H04M 2201/42* (2013.01); *H04M 2203/6018* (2013.01)

(58) Field of Classification Search
CPC .......................... H04M 3/5191; H04M 3/5183
USPC .................................................... 379/265.09
See application file for complete search history.

(56) References Cited

U.S. PATENT DOCUMENTS

| | | | |
|---|---|---|---|
| 2011/0130168 A1 | 6/2011 | Vendrow et al. | |
| 2015/0032688 A1* | 1/2015 | Dayon | G06F 16/951 707/609 |
| 2016/0349960 A1* | 12/2016 | Kumar | G06F 3/04817 |
| 2018/0324290 A1 | 11/2018 | Vendrow | |

OTHER PUBLICATIONS

"International Search Report and Written Opinion Issued in PCT Application No. PCT/US2019/063132", dated Feb. 21, 2020, 11 Pages.

* cited by examiner

*Primary Examiner* — Rasha S Al Aubaidi
(74) *Attorney, Agent, or Firm* — Schwegman Lundberg & Woessner, P.A.

(57) ABSTRACT

Methods and systems for object oriented call management are disclosed. In one aspect, a system implements a plurality of call objects, each call object encapsulating information relating to an active call, each call object configured to display a call user interface, and a messaging system configured to provide messaging between a plurality of accounts, the messaging system configured to distribute references to one or more of the plurality of call objects to at least some of the plurality of accounts, and to cause display of the call user interface within at least one of the plurality of accounts, and is further configured to receive input selecting at least one of the controls of the call user interface, and to communicate the selection to the respective call object.

20 Claims, 16 Drawing Sheets

OBJECT ORIENTED CALL MANAGEMENT

BACKGROUND

Management of voice communications is critical to the success of many organizations. Voice communications provide an opportunity for direct communication between an organization and its customers. The customer's experience with these voice communications reflects directly on the organization itself, and may be highly relevant in any ongoing relationship between the organization and a customer. For example, whether a customer continues to do business with a particular organization may be highly influenced by the quality of the voice communications with the organization. Thus, improved methods and systems that assist organizations in delivering superior service by managing calls are needed.

BRIEF DESCRIPTION OF THE DRAWINGS

In the drawings, which are not necessarily drawn to scale, like numerals may describe similar components in different views. Like numerals having different letter suffixes may represent different instances of similar components. The drawings illustrate generally, by way of example, but not by way of limitation, various embodiments discussed in the present document.

DETAILED DESCRIPTION

Figure 1:
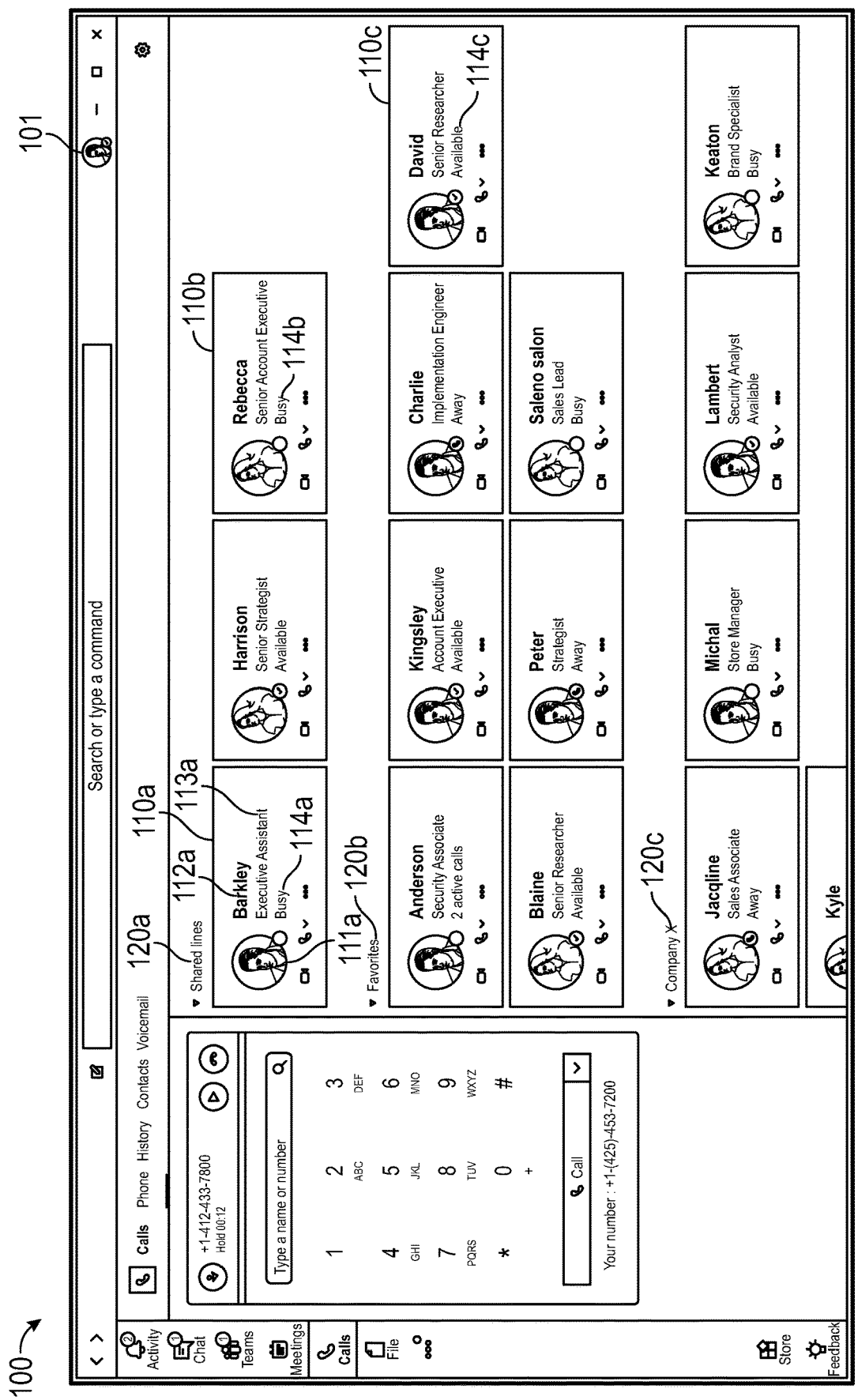
FIG. 1 is an example user interface that is implemented by at least one of the disclosed embodiments.

The following description and the drawings sufficiently illustrate specific embodiments to enable those skilled in the art to practice them. Other embodiments may incorporate structural, logical, electrical, process, and other changes. Portions and features of some embodiments may be included in, or substituted for, those of other embodiments. Embodiments set forth in the claims encompass all available equivalents of those claims.

As discussed above, management of voice communication can be critical for an organization's success. Existing system present a technical problem in that they generally provide for rigid paradigms for management of calls. For example, existing systems may implement user interfaces that present a consistent view of incoming calls, and a consistent set of UI controls that are presented on those user interfaces. If a first operator within an organization is unable to assist a particular caller, it can be difficult for that first operator to identify another individual within the organization who is available and better positioned to assist. While the first operator searches for an appropriate contact, the caller waits. Thus, both the first operator's time and the caller's time is essentially wasted until an appropriate contact is identified. In some cases, a caller may be forgotten by the first operator and wait on hold until the caller gives up, resulting in of course an unsatisfactory experience. Thus, a technical problem is presented by existing systems due to their lack of flexibility to respond in a dynamic fashion to a constantly changing call environment. Furthermore, because call management and messaging between members of an organization are not integrated, these existing systems create additional organizational and management challenges when communication between members of an organization is necessary to properly manage the dynamic call environment.

The disclosed embodiments solve these technical problems by providing a technical solution that delivers improved management of calls by encapsulating each call within an object-oriented structure termed a call object. The call object encapsulates both data and behavior relating to the call. The data may define, for example, callee and caller information for the call. The data may also define, for example, input stream(s) and/or output stream(s) for the call. The input stream(s) may provide incoming audio data for the call, for example, from an external network such as a PBX or IP based call network. The input stream(s) may also provide incoming audio data from one or more users of a messaging system (e.g. 240, discussed below). The output stream(s) for the call may provide data generated by a messaging system (e.g. 240) for the call. For example, when a user of the messaging system speaks as part of the call, this may generate output data that is written to the output stream. The data may then be distributed to other users, both within the messaging system and external to the messaging system, via the output stream(s).

The behavior is encapsulated via pointers to methods, including algorithms and/or instructions that configure hardware processing circuitry to implement the behavior. The behavior may include causing display of one or more user interfaces relating to the encapsulated call. Causing display may include generating one or more network messages, for example, from a server, back-end, or cloud implementation, to a client device. Upon reception of the one or more network messages, the client device displays the user interface in response to the network messages. The one or more network messages may include data that defines or identifies the respective user interfaces. In some other aspects, a "cause display" operation may be performed on a device that is writing the displayed information directly to a display device, such as a monitor directly connected to a device such as a laptop, desktop, or mobile device. Causing display is used throughout this disclosure to avoid an inference that a display of a user interface must necessarily occur on an electronic display "hard connected" to a device performing the cause display operation. However, throughout this disclosure, a description of a user interface or user interface element being displayed, is not meant to infer that a particular component of the messaging system 240 is displaying the user interface element on a device that is hard connected to a device performing the function, but instead, may indicate that the display is caused on a remote device, connected to a device performing the display operation via a soft connection via a network.

These user interfaces may be referred to collectively as a "call user interface(s)" through this disclosure. For example, the call object may cause display a call user interface showing call status information, such as a duration of the call or a status of the call. The status of the call may indicate, for example, whether the call is on hold or connected between at least two human callers. The call object may also cause display one or more user interface controls operative to control the call. For example, one user interface control may provide for a control that allows a user to pick up or answer the call. Another control may provide for the call to be transferred to a particular number. Another control may provide for the call to be barged (e.g., allows the user to listen in on a live call without the caller or another user knowing (also known as silent monitoring)).

One advantage of the implementation of call objects in this manner is it provides for greatly improved sharing of call information across a plurality of users of a messaging system. Additionally, because the sharing of call information is largely determined by users on a dynamic basis, the sharing of call information is more flexible when compared to existing systems that define rigid structures or user interfaces for call information.

For example, the disclosed embodiments provide for including a call object (or a reference to the call object), in an object container, such as an email message, text message, or social network feed by a first user of the messaging system. As the call object (or reference to the call object) is received by one or more other users, via the email message, text message, or social network feed, those other users may then interact with the call via the included call object (or reference). For example, the objects may be invoked using remote method invocation (RMI). Alternatively, some embodiments may utilize .NET remoting or the windows communication framework (WCF) to accomplish this.

In some embodiments, if a second user receives the reference to the call object via a social network feed, that second user may obtain visibility to status information via the call's call user interface, which may be displayed within the feed. The second user may, depending on their access rights, decide to control the call in some manner, such as, for example, join or answer the call via one or more user interface controls that may be displayed as part of the call object's call user interface. Thus, by providing for user controllable and dynamic sharing of call information, an ability for an organization to dynamically adapt to the needs of active calls is greatly improved, resulting in improved customer satisfaction, as well as more efficient handing of calls, further resulting in reduced staff time needed to deliver superior service.

FIG. 1 is an example user interface that is implemented by at least one of the disclosed embodiments. User interface 100 is displayed to a user 101 based on access rights and/or group membership of the user 101. User interface 100 shows a plurality of cards, each card showing contact information for a different individual or user. For clarity of illustration, only three of the cards are labeled using labels 110a-c. Each of the cards 110a-c may be displayed (or cause to be displayed) by an underlying account profile object, discussed in more detail below. The contact information of each card includes a photo (e.g. 111a), name (e.g. 112a), title (e.g. 113a), and availability status indicators (e.g. 114a). Availability status indicators 114b-c are also identified for cards 110b-c respectively. As shown, the cards are organized into three groups 120a-c based on group membership of the user 101. The cards may be organized according to membership of individual users represented by respective cards. For example, cards shown under group 120a may represent individuals included in the "shared lines" group 120a, while cards shown under group 120b represent users included in a "favorites" group 120b.

To cause display of the availability status indicators 114a-c for each individual or user, the user interface 100 may invoke one or more call objects associated with each of the individuals. The call objects may cause display of the availability status indicators 114a-c themselves, or provide the information to the user interface 100 which may then cause display of the information. These design elements are further developed below.

Figure 2A:
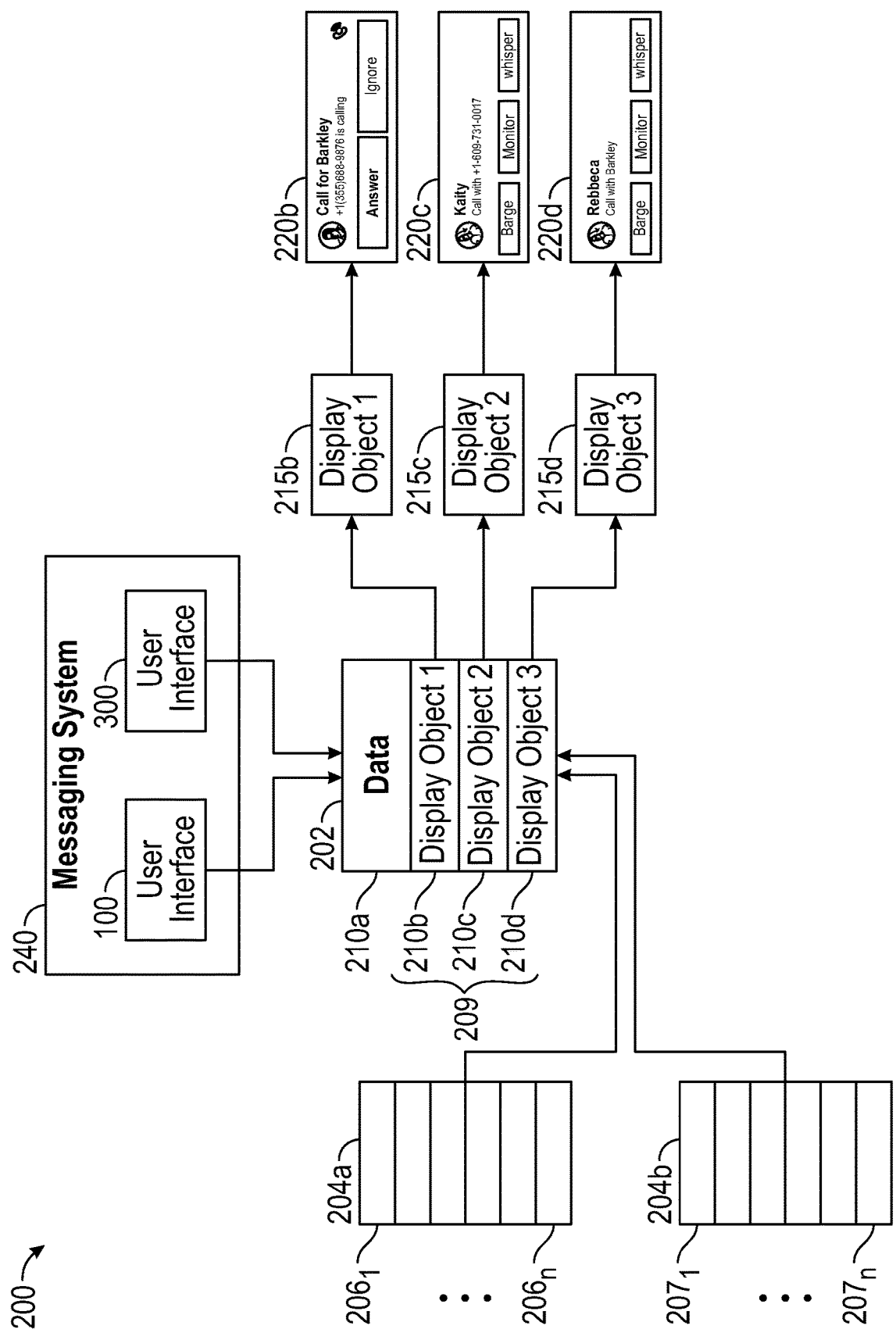
FIG. 2A is an example block diagram of data structures that may be implemented in one or more of the disclosed embodiments.

FIG. 2A is an example block diagram of data structures that may be implemented in one or more of the disclosed embodiments. FIG. 2 shows a call object 202. Also shown are two object collections 204a-b. The object collections 204a-b each include one or more references $206_{1 \ldots n}$ and $207_{1 \ldots n}$ to call objects such as the call object 202. Each of the plurality of call objects encapsulate information relating to an active call. The call is active in the sense that there is an end to end connection between a caller and a callee, and resources are allocated to maintain the connection. Calls on hold are considered active for purposes of this disclosure. The call objects may be generated when either a user of a messaging system initiates a call, or an incoming call is received, for example, from a PBX or external IP call network. When a call is ended, for example, fewer than two parties remain on the call, the call object may be deallocated or destroyed. For example, dynamic memory allocated to the call object may be returned to a free memory pool, and references to the call object removed, for example, via a garbage collection process.

Each of the call objects (e.g. 202) includes object specific data 210a, which may store various information relating to the respective call. For example, the object specific data 210a may store information regarding a source caller of the call, a time the call has been connected and/or on hold, caller id information for the call, such as a caller name and/or phone number, addressing information for the call, and other information. The call object 202 also includes a vtable 209. The vtable 209 includes one or more pointers to methods 210b-d. While FIG. 2 shows a vtable 209 including three method pointers 210b-d, one of skill would understand that the vtable 209 could include any number of pointers to methods. The method pointers 210b-d point to display object methods 215b-d. The methods 215b-d may include instructions that configure hardware processing circuitry to perform operations. The example methods 215b-d include instructions that configure processing circuitry to display different variations of a call user interface. As shown in FIG. 2, the method 215*b* displays a call user interface 220*b*. Method 215*c* displays a call user interface 220*c*. Method 215*d* displays call user interface 220*d*.

A call user interface is a term used throughout this disclosure to describe a user interface displayed by a call object 202. The call user interface, when displayed, may be used to manipulate the underlying call object 202 in a graphical manner. For example, the call user interface may be dragged from one location or object container and dropped to another location or object container. Such operations on the call user interface, which is itself just a user interface, cause operations to occur with respect to a call object displaying the call user interface. For example, graphically dragging a call user interface from one object container to a second object container may add a reference to the underlying call object displaying the call user interface to the second object container. In some aspects, this capability may be provided by "OnDrag( )" and "OnDrop" methods implemented by the call object. These methods may be called by a user interface when the call user interface is dragged and dropped as appropriate.

The call user interface may display one or more data relating to a call represented by the underlying call object. For example, the call user interface may present information relating to a source of the call, such as a source phone number or location, or a messaging system 240 user, duration of the call, current status of the call, such as whether the call is on hold, being forwarded, or active with one or more users. The call user interface may also display one or more user interface controls, such as one or more buttons or other controls. The one or more user interface controls may function to control the call in some manner. For example, a first user interface control may function to place the call on hold, forward the call, pick up the call, transfer the call, listen in on the call, or other call control functions.

The call object 202 may be invoked via the messaging system 240. The messaging system may support a variety of messaging functions between a plurality of accounts. For example, email, instant messaging, and feed-based communication between users may be supported by the messaging system 240. The messaging system 240 may implement a plurality of user interfaces, including the user interface 100, discussed above with respect to FIG. 1, or other user interfaces, such as the user interface 300, 400, or 500, each of which is discussed in more detail below. By invoking the call object 202, the user interfaces 100 and 300 may cause display of one or more variants of a call user interface, such as any of the call user interfaces 220*b-d* shown in FIG. 2. Generally, a call user interface may display a variety of information for a call encapsulated or represented by a call object 202. For example, a call user interface may display information identifying the call, such as a source phone number, source geographic region, source caller (e.g. a user identity such as a name). A call user interface may also display one or more user interface controls. The controls may be configured to control the call represented by the underlying call object. As discussed above, the display of the call user interface may be conditioned on access controls associated with a user invoking a method (e.g. 210*a-c*) of the call object 202.

Figure 2B:
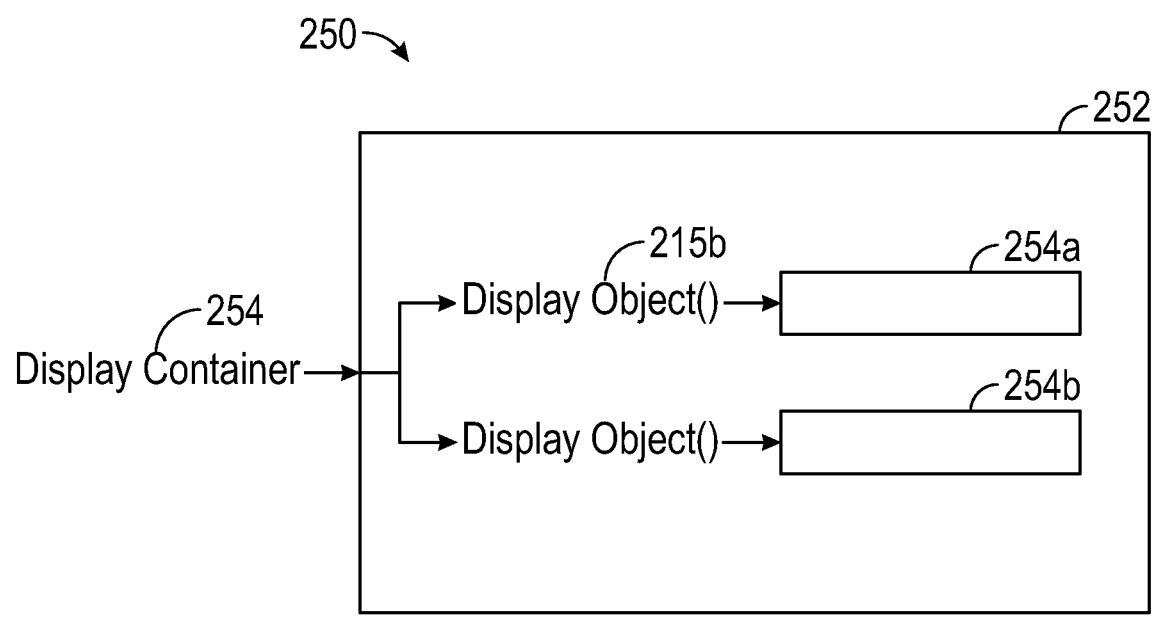
FIG. 2B illustrates an object container displaying an object contained within it, such as a call object (e.g. 202).

FIG. 2B illustrates an object container displaying an object contained within it, such as a call object (e.g. 202). FIG. 2 shows an object container 252. The object container 252 may be included in, for example, an email message body, text message body, or a feed, such as a feed displayed to one or more users of a social network subscribed to the feed. When the container is displayed by a hosting application, such as an email message application, social networking application, web browser, or text message application, the hosting application may call a method of the container object that displays the container. An example display container method is illustrated as method 254 in FIG. 2B. When the display container method 254 is invoked by the host application, it may call a display object method for each object included in the container 252. Thus, FIG. 2B shows the display container method 254 invoking two display object methods, 215*b* for a first object 254*a*, and display object method 260 for a second object 254*b*. Object 254*a* may be a call object (e.g. 202), as discussed above with respect to FIG. 2A.

Figure 2C:
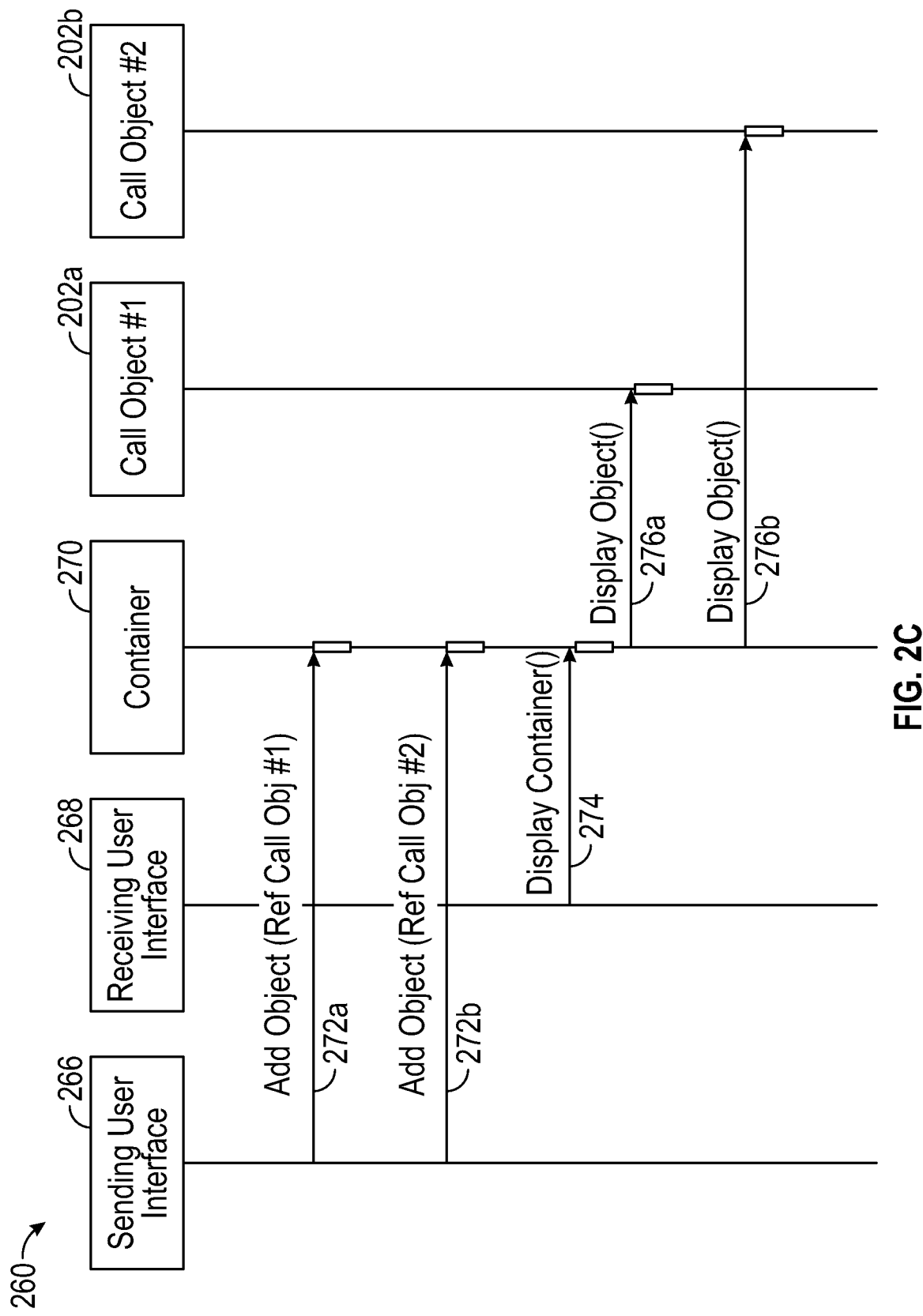
FIG. 2C is an object sequence diagram illustrating example interactions between a user interface, an object container, and two call objects

FIG. 2C is an object sequence diagram illustrating example interactions between a user interface, an object container, and two call objects. The sequence diagram 260 of FIG. 2C shows a sending user interface object 266, a receiving user interface object 268, an object container 270, a call object 202*a*, and a call object 202*b*. The sending user interface object 266 may send a message, such as an email message, text message, or feed to the receiving user interface object 268. As part of constructing the message, the sending user interface 266 may add one or more call objects to the object container 270. FIG. 2C shows two call objects 202*a-b* being added to the object container 270 via calls to an "AddObject( )" method of the container 270. Each "AddObject( )" method call, 272*a* and 272*b*, passes a reference to either the first call object 202*a* or the second call object 202*b*, to add the respective object 202*a-b* to the object container 270. The sending user interface object 266 may then send the object container 270 to the receiving user interface object 268. The sending may be accomplished via email, text message, or by including the container 270 in a feed to which the receiving user interface has access, for example, on behalf of an account.

The receiving user interface 268 then displays the container 270 by calling a "DisplayContainer( )" method 274 of the object container 270. As part of the DisplayContainer( )" method 274, the container 270 enumerates a list of objects included in the container 270, and calls a "DisplayObject( )" method for each object in the container. FIG. 2C shows the container 270 calling call object 202*a* "DisplayObject( )" method 276*a* and call object 202*b* "DisplayObject( )" method 276*b*. The call objects 202*a-b* may implement their "DisplayObject( )" method by displaying one of the call user interfaces discussed herein.

Figure 3:
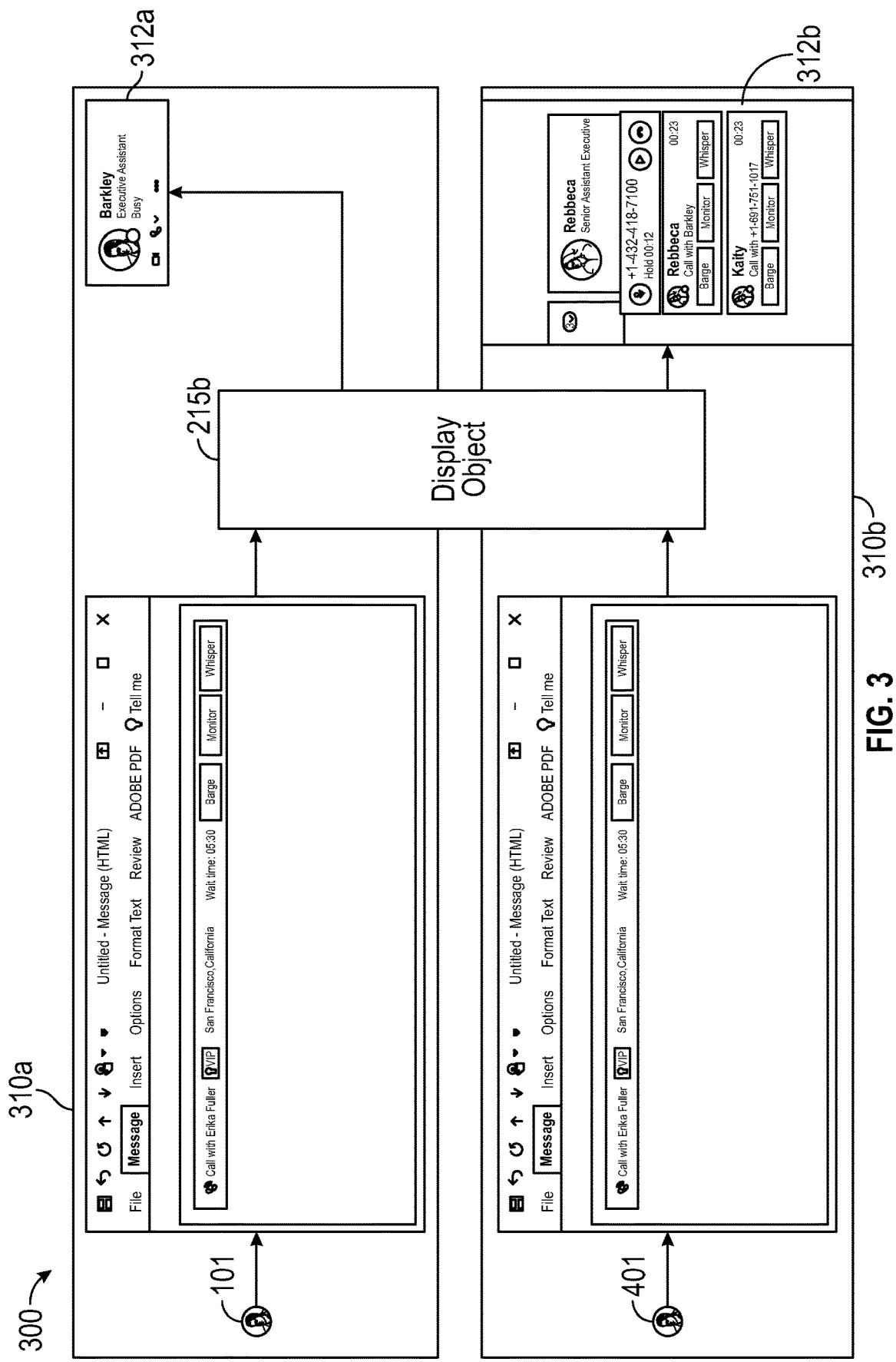
FIG. 3 is a block diagram illustrating call flows that may be implemented in one or more of the disclosed embodiments.

FIG. 3 is a block diagram illustrating call flows that may be implemented in one or more of the disclosed embodiments. FIG. 3 shows two users, user 101 and user 401, both calling the display object method 215*b*. Method 215*b* was discussed above with respect to FIGS. 2A and 2B. The user 1 101 has a certain set of access rights, represented as box 310*a*. The user 2 401 has a second set of access rights, represented as box 310*b*. The access rights 310*a* and 310*b* may be based, for example, on each of the respective users 101 and 401 position within an organizational hierarchy. For example, the first user 101 may be a supervisor of the second user 401 in some embodiments.

FIG. 3 shows that the method 215*b* may display a different version of a call user interface, shown as call user interfaces 312*a* or 312*b* depending on which access rights 310*a* or 310*b* are possessed by a calling user (e.g. 101 or 401).

Figure 4:
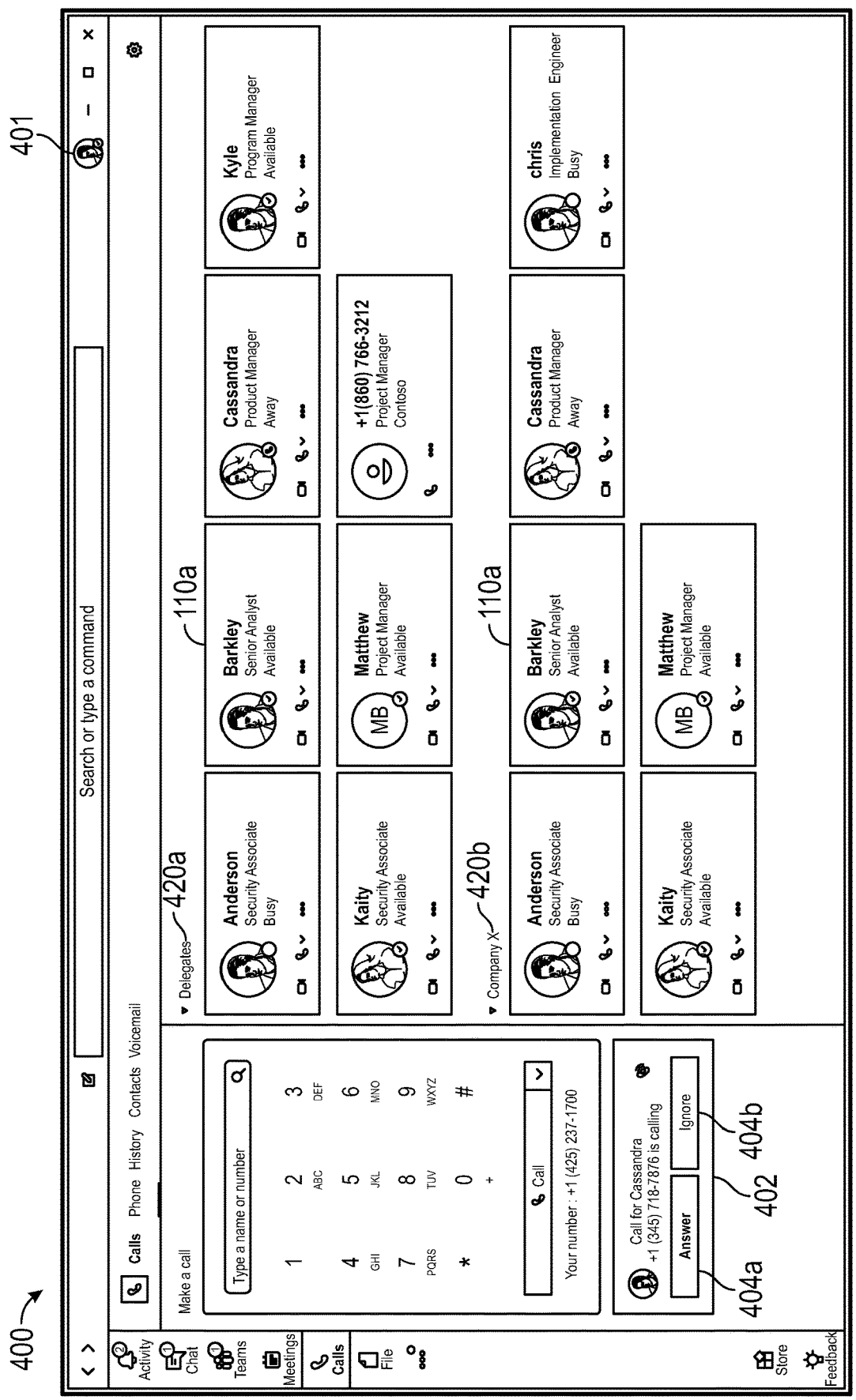
FIG. 4 is an example of a user interface that may be implemented in one or more of the disclosed embodiments.

FIG. 4 is an example of a user interface that may be implemented in one or more of the disclosed embodiments. The user interface 400 is displayed to a user 401. User interface 400 is displayed to the user 401 based on access rights and/or group membership of the user 401. The user interface 400 shows cards for other users similar to that of user interface 100, discussed above with respect to FIG. 1. For example, user interface 400 includes card 110*a* also shown in FIG. 1. User interface 400 also shows the cards organized into different groups 420*a-b*. The user 401 is a member of each of the groups 420*a-b*, thus their respective display on the user interface 400.

Cards for some users or individuals may be included in multiple groups. For example, card 110*a* is shown in both group 420*a* and group 420*b*. FIG. 4 also shows a call user interface for an incoming call 402. The call user interface for an incoming call 402 includes user interface controls 404*a-b*, which provide for control of the incoming call. The call user interface for an incoming call 402 may be displayed by relying on an underlying call object (e.g. 202). For example, the user interface 400 may invoke a "displayobject( )" method of the call object to display the call user interface for the incoming call 402. Alternatively, the user interface 400 may generate the call user interface 402 itself based on data obtained from the underlying call object. These concepts are further developed below.

Figure 5:
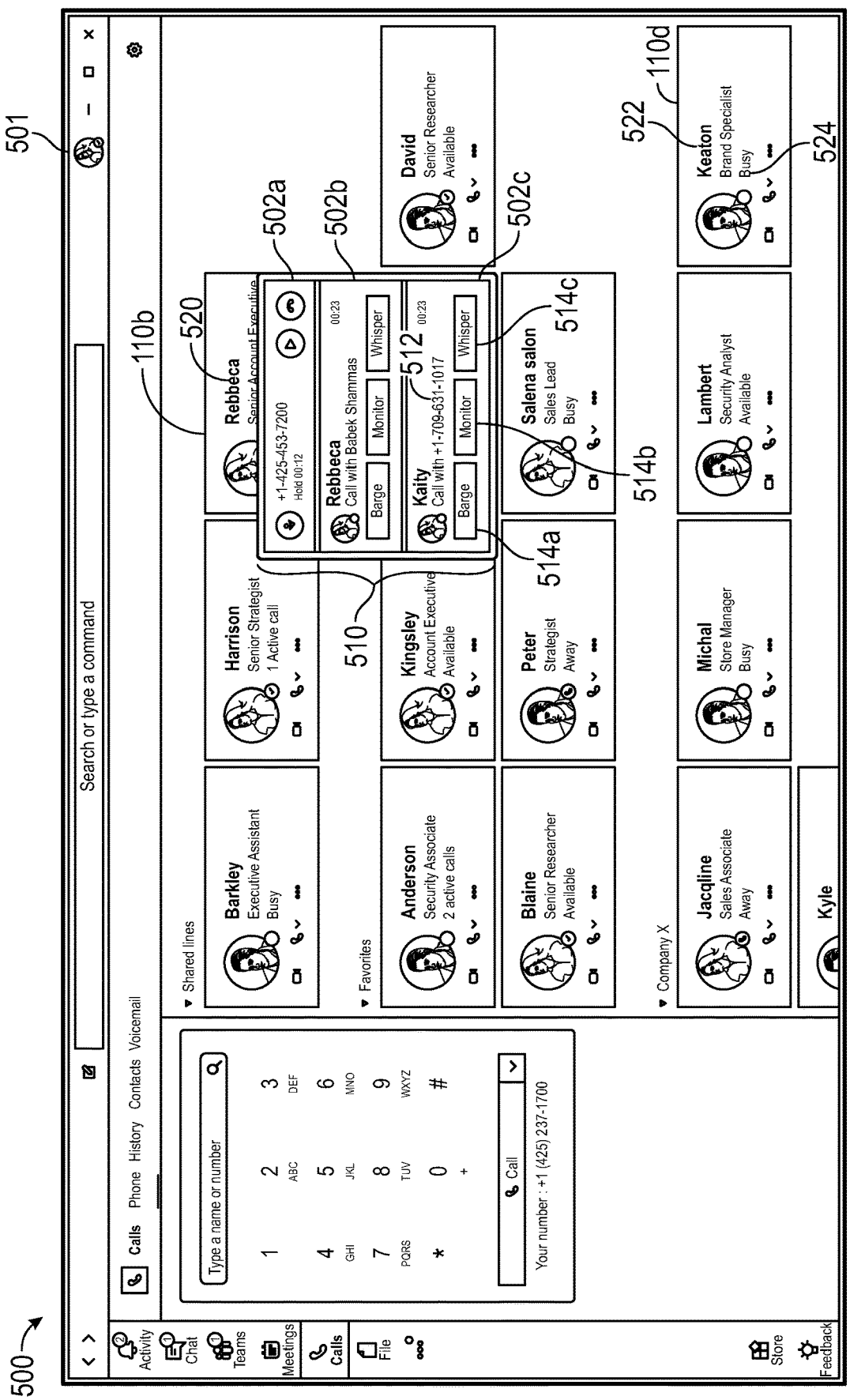
FIG. 5 shows another user interface that may be implemented by one or more of the disclosed embodiments

FIG. 5 shows another user interface that may be implemented by one or more of the disclosed embodiments. User interface 500 is displayed to a user 501 based on access rights and/or group membership of the user 501. User interface 500 shows card 110*b* also shown in FIG. 1. FIG. 5 also shows a hover user interface 510 that may be displayed when a pointing device hovers over the card 110*b*, or in some aspects, over the availability status indicator 114*b* (not shown in FIG. 5, but shown in FIG. 1). The hover user interface 501 may be displayed by an account profile object, discussed in more detail below. A separate account profile object may display each of the plurality of cards shown in FIG. 5, including the card 110*b* and 110*d*.

The hover interface 510 includes a display of three call user interfaces 502*a-c*. The first call user interface 502*a* shows a call that is on hold, and is presented using a different color than the call user interfaces 502*b* and 502*c*, which are not on hold.

The three calls displayed in the hover interface 510 may be associated with the user 520. For example, the hover user interface 510 enumerates a list of calls a user 520 represented by the card 110*b* is participating in or is associated with. The enumeration of the list of calls may be supported by a call association table 1160, discussed below with respect to FIG. 11. As discussed below with respect to FIG. 11, the disclosed embodiments may maintain associations between accounts of the messaging system 240 and calls. These associations may be used to determine which calls are displayed in the hover interface 510, which is specific to the user 520. When a cursor of the user interface 500 is placed over a different user, a different hover interface may be presented.

Each call user interface displays a call identification 512, and controls 514*a-c*. For clarity of illustration, only one call user interface's components are illustrated.

The hover interface 510 may also be supported by call objects, one for each of the calls represented by the call user interfaces 502*a-c*. For example, the hover interface 510 may call a method (e.g. "OnHover( )") in each of the call objects (not shown in FIG. 5), to display the call user interfaces 502*a-c*.

FIG. 5 also shows a card 110*d* representing a user 522. The user 501 may have a different relationship with the user 522 than with the user 520. For example, the user 501 may be a peer of the user 522, while the user 501 may be a supervisor of the user 520. Thus, the user 501 may be provided with increased visibility to user's 520 call activity, as shown by the hover menu 510, relative to the reduced visibility of the user's 522 call activity, which may be implemented to show only a busy or available indication, as shown with the indication 524.

Figure 6:
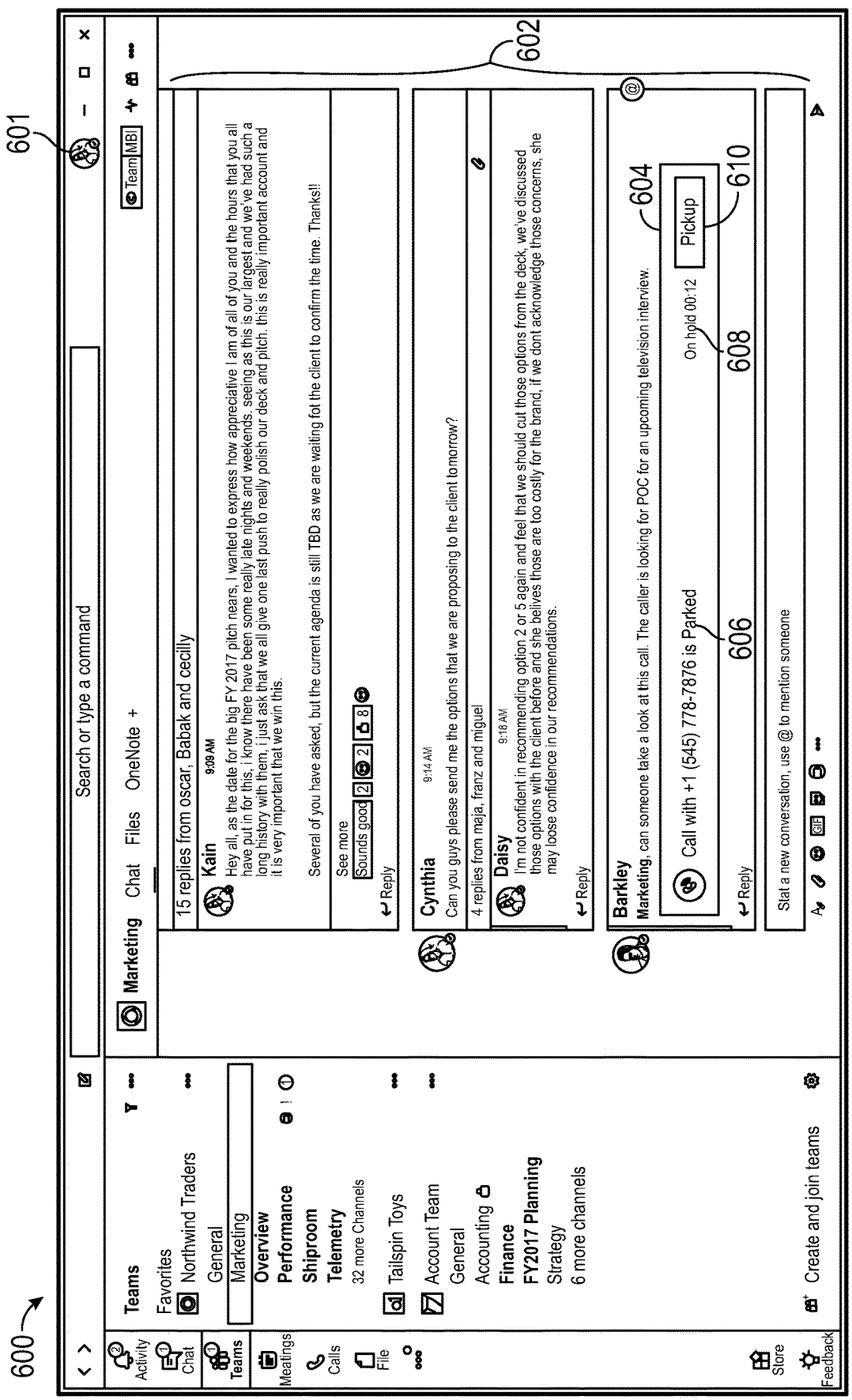
FIG. 6 shows one embodiment of a user interface that may be implemented in one or more of the disclosed embodiments

FIG. 6 shows one embodiment of a user interface that may be implemented in one or more of the disclosed embodiments. FIG. 6 shows a user interface 600 that includes a feed 602. The feed 602 may be displayed to one or more users of a messaging system (e.g. 240). FIG. 6 shows the feed as displayed to a user 601. The user 601 is one of the one or more users of the messaging system. User interface 600 is displayed to the user 601 based on access rights and/or group membership of the user 601.

In some aspects, the messaging system 240 may support a feed capability that allows one or more users or accounts of a messaging system (e.g. 240) to subscribe (and unsubscribe) to a feed. When new information is added to the field, this new information may be displayed on a user interface of subscribed accounts.

Included in the feed 602 is a call user interface 604. The call user interface 604 includes call identifier information 606, call duration information 608, and a user interface control 610 configured to control the call associated with the call user interface 604. The call user interface 604 is displayed by an underlying call object (e.g. 202), not visible in the feed 602 or call user interface 604. The call object or a reference to the call object may be added to the feed 602 by a first user. The call object may be added to the feed 602 via, for example, a drag and drop operation, for example, as discussed below with respect to FIG. 10. Briefly, a user may drag a call user interface displayed by the underlying call object from one data container to another. A source data container for the call object displaying the call user interface 604 could be, in various embodiments, a second feed (not shown), an email message (not shown), or any other data container.

Figure 7:
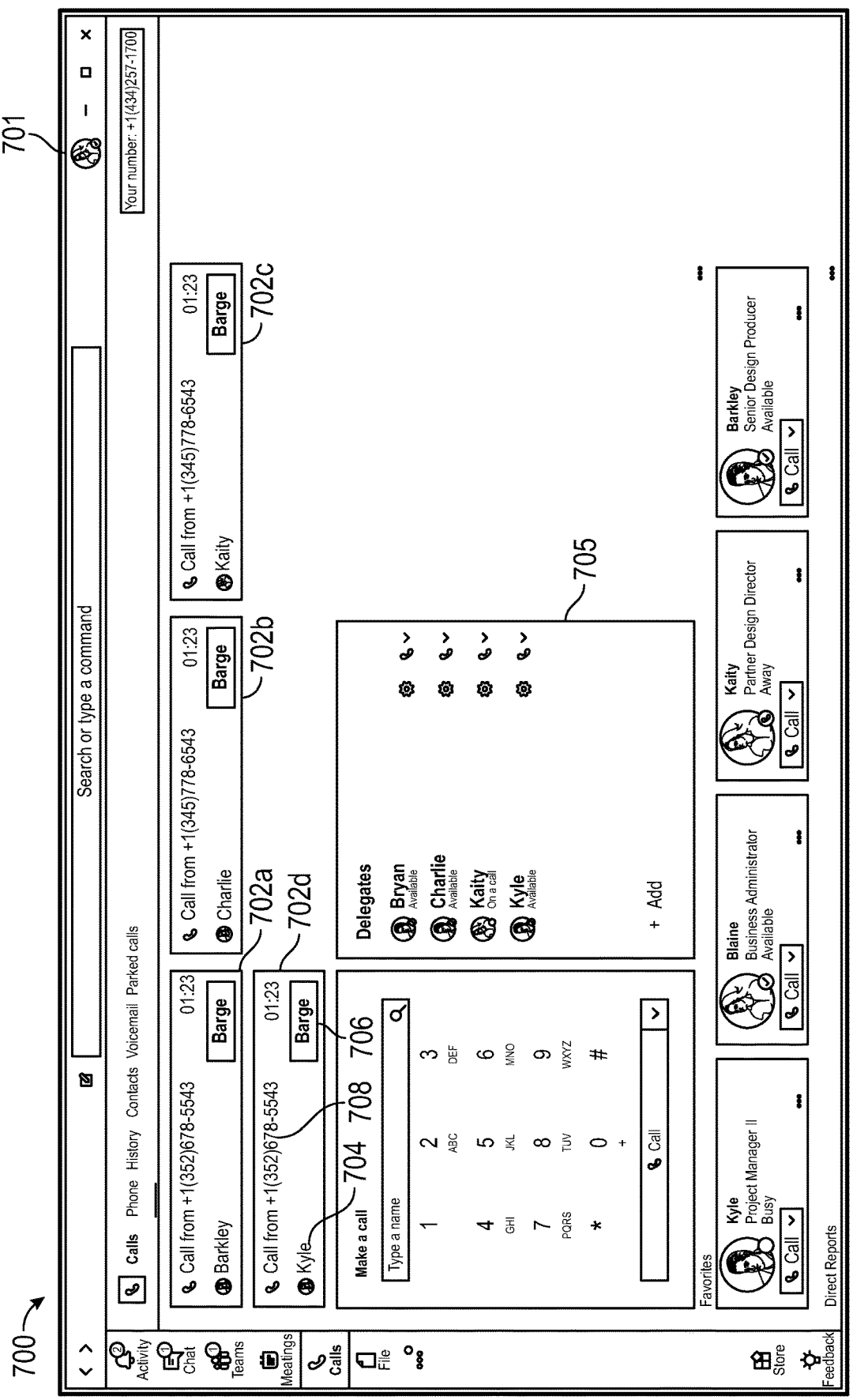
FIG. 7 shows one embodiment of a user interface that may be implemented in one or more of the disclosed embodiments

FIG. 7 shows one embodiment of a user interface that may be implemented in one or more of the disclosed embodiments. FIG. 7 shows a user interface 700 displayed to a user 701. User interface 700 is displayed to the user 701 based on access rights and/or group membership of the user 701. The user interface 700 shows four call user interfaces 702*a-d*. Each call user interface 702*a-d* shows call source information 704, a user interface control 706 to control the call, and call identification information 708. The information displayed by the call user interfaces 702*a-d* is based on access rights and/or group membership of the user 701. User interface 700 shows a list of delegates 705 of the user 701.

Figure 8:
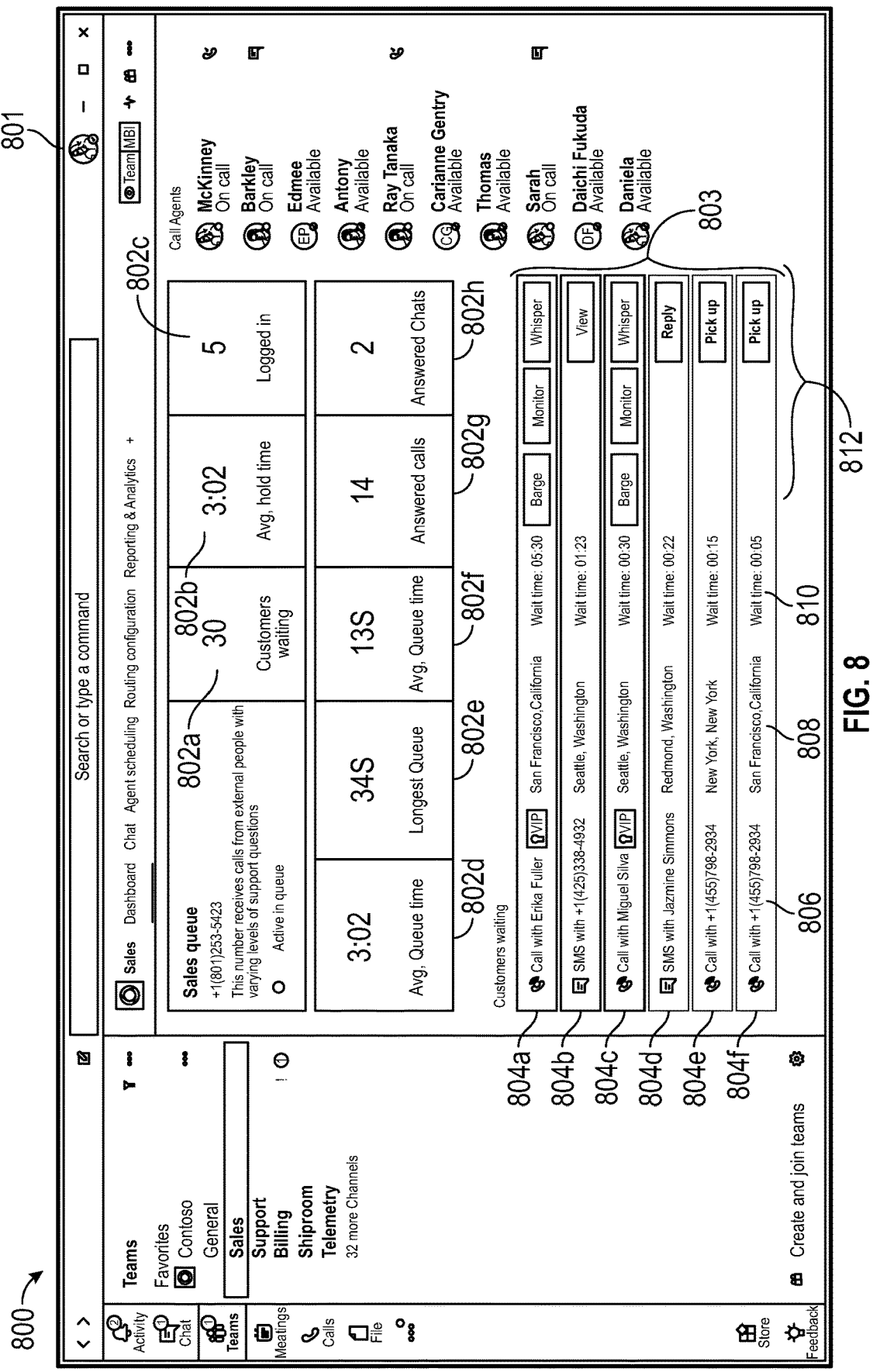
FIG. 8 shows one embodiment of a user interface that may be implemented in one or more of the disclosed embodiments.

FIG. 8 shows one embodiment of a user interface that may be implemented in one or more of the disclosed embodiments. The user interface 800 displays data to a user 801. User interface 800 is displayed to the user 801 based on access rights and/or group membership of the user 801. The data displayed in the user interface 800 is derived from at least a portion of a collection of call objects. Call user interfaces 804*a-f* identify the portion of call objects included in the collection. Each of the call user interfaces 804*a-f* includes call identification information 806, a source location for the call 808, a queue time 810, and one or more user interface controls 812 for controlling the call. To preserve figure clarity, these items are only identified in FIG. 8 for one of the call user interfaces 804*f*, but are present, in various forms, for the other call user interfaces 804*a-e* displayed in the user interface 800. The user interface 800 also displays statistics 802*a-h* for the collection. The statistics 802a-f may be computed based on information obtained from each call object within the collection. For example, an underlying call object (e.g. 202) may support methods that provide data such as a hold time of the call, whether the call is on hold and if so, for how long, whether the call has been answered, and other information which may be necessary to allow the collection to complete the statistics 802a-f.

Figure 9:
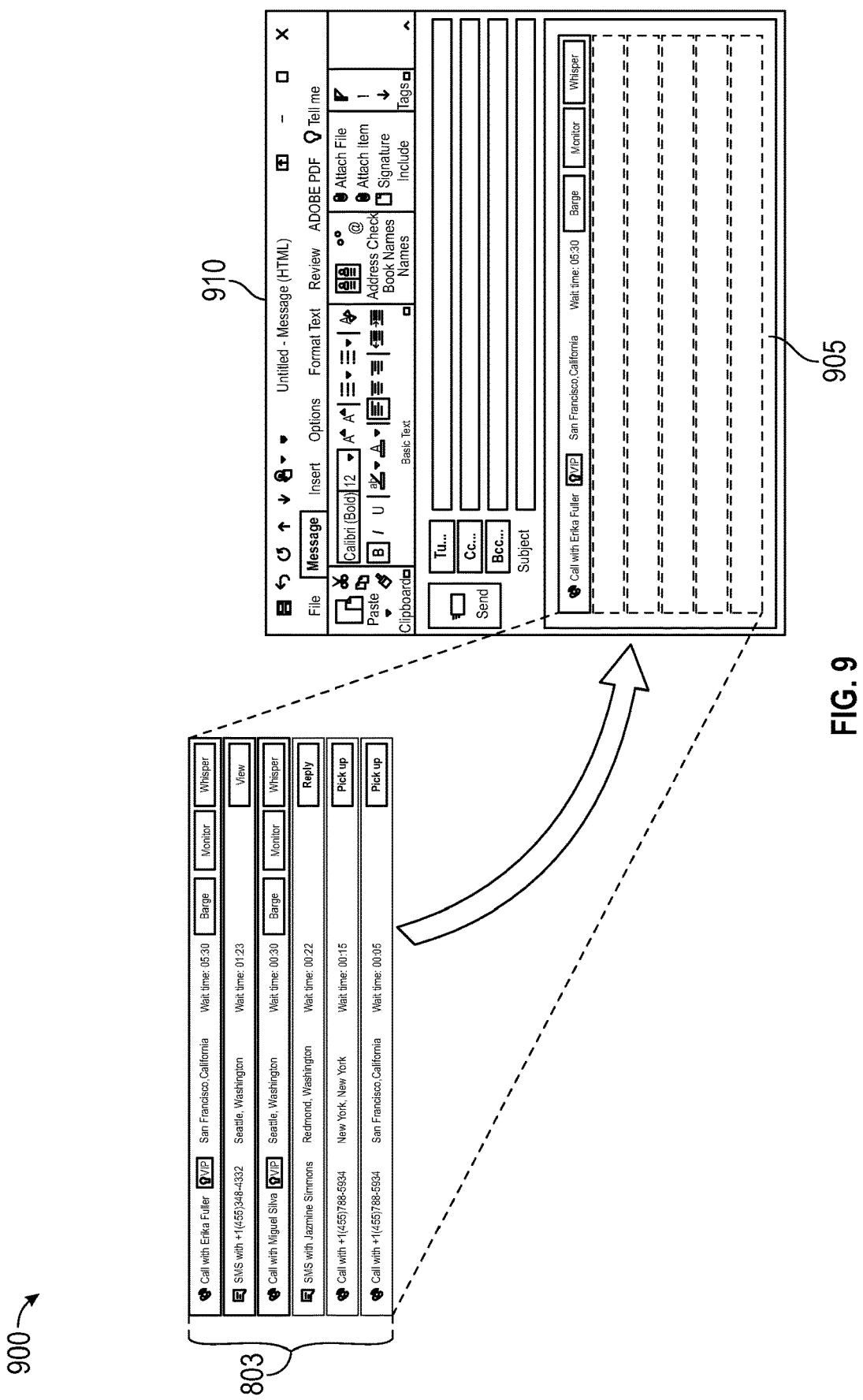
FIG. 9 shows one embodiment of a call object being dragged from a first container to a second container

FIG. 9 shows one embodiment of a call object being dragged from a first container to a second container. FIG. 9 shows the first container implemented as the queue 803 from FIG. 8. A user of the messaging system 240 may drag one of the displayed call user interfaces 804a-f to the object container 905, shown in FIG. 9 as an email message body. Dragging the one displayed call user interface 804f to the object container 905 has the effect of including a reference to an underlying call object (e.g. 202) displaying the one call user interface 804f in the object container 905. The object container 905 may then be sent via an email message 910 to another user of the messaging system 240. Upon receipt of the email 910, the call may be accessed via the referenced call object included in the container 905.

Figure 10:
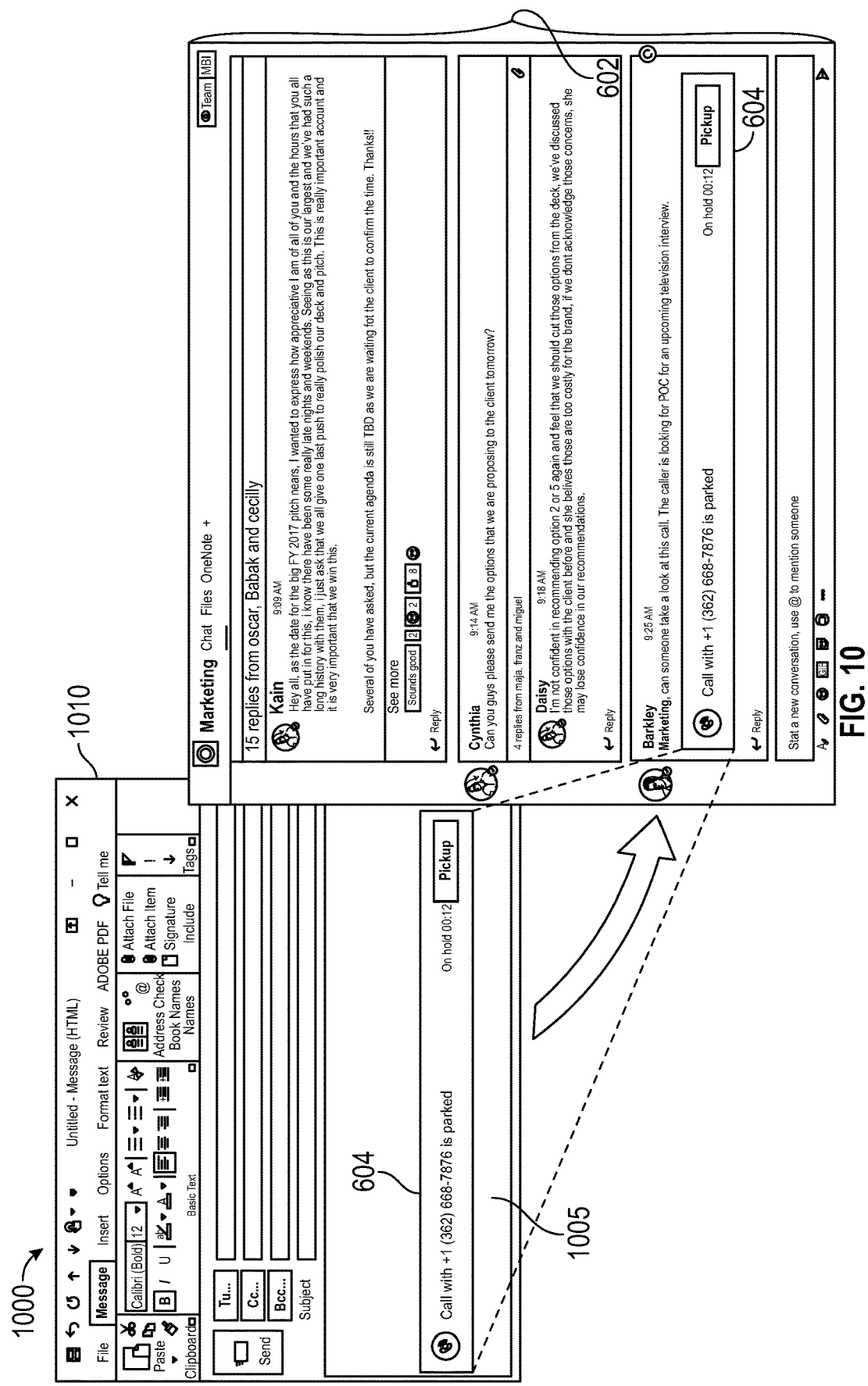
FIG. 10 shows another example of including a call object in an object container.

FIG. 10 shows another example of including a call object in an object container. FIG. 10 shows an email message 1010 that includes an object container 1005. The object container 1005 is shown containing a reference to a call object displaying the call user interface 604. A user may drag the displayed call user interface 604 from the container 1005 to the feed 602. Upon dropping the call user interface 604 onto the feed 602, a reference to a call object displaying the call user interface 604 is included in the feed (object container) 601. Once included in the feed 602, the call object is accessible to any other user viewing the feed 602, depending on access rights of the individual user.

Figure 11:
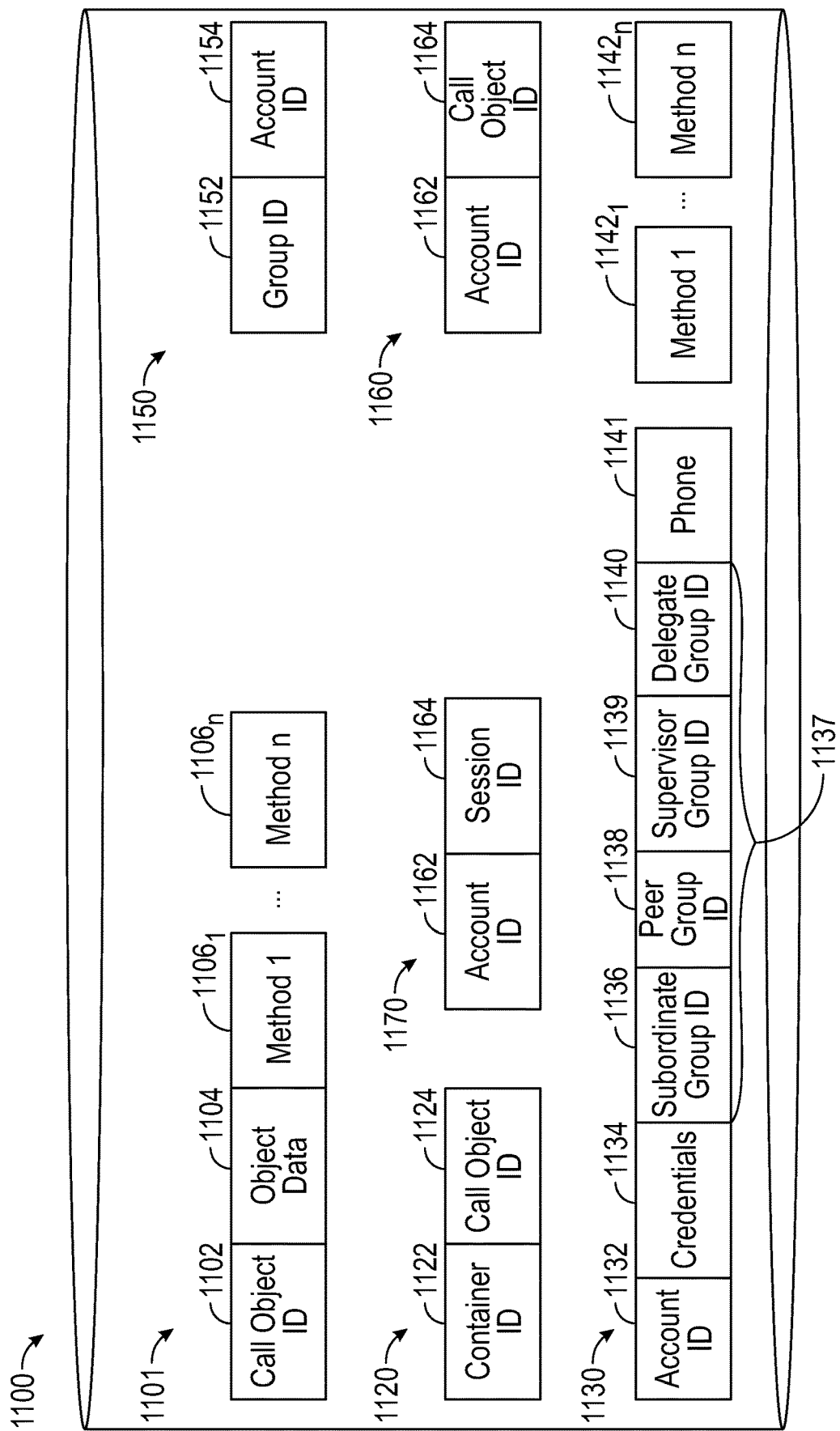
FIG. 11 shows example data structures that may be implemented by one or more of the disclosed embodiments.

FIG. 11 shows example data structures that may be implemented by one or more of the disclosed embodiments. FIG. 11 shows a datastore 1100. While the discussion below of the data structures of datastore 1100 describes these data structures as representing relational database tables, one of skill would understand that these data structures may be implemented in various ways depending on embodiment. For example, the data structures may be implemented as dynamic memory objects and organized via linked lists, or implemented in an unstructured data store in some embodiments.

FIG. 11 shows a call object table 1101, container table 1120, account profile table 1130, and group table 1150. The call object table 1101 includes a call object identifier 1102, object data 1104, one or more method pointers $1106_{1\ldots n}$. The call object identifier 1102 uniquely identifies a call object (e.g. 202). Object data 1104 stores information specific to a particular call. For example, the object data 1104 may store information relating to a callee and/or a caller for a call represented by the call object (identified by call identifier 1102). Each of the method pointers $1106_{1\ldots n}$ points to an implementation of a method for delivering one or more services relating to the call represented by the call object. For example, the methods identified via the method pointers $1106_{1\ldots n}$ may display one or more of the call user interfaces discussed above.

The container table 1120 includes a container id 1122 and a call object id field 1124. The container id 1122 uniquely identifies an object container. An object container could include an email message body, text message, feed, or other object container. The call object id 1124 identifies a call object included in the container. The call object id 1124 may be cross referenced with the call object id 1102.

The account profile table 1130 includes an account identifier 1132, credentials 1134, subordinate group identifier 1136, peer group id 1138, supervisor group identifier 1139, and a delegate group identifier 1140. The subordinate group identifier 1136, peer group identifier 1138, and supervisor group identifier 1139 and delegate group identifier 1140 may collectively be considered access privileges 1137 in some embodiments. The subordinate group identifier 1136 identifies a group in the group table 1150 that identifies subordinate accounts of the account identified by the account identifier 1132. The peer group identifier 1138 identifies a group in the group table 1150 that identifies peer accounts of the account identified by the account identifier 1132. The supervisor group identifier 1139 identifies a group in the group table 1150 that identifies supervisor accounts of the account identified by the account identifier 1132. The delegate group identifier 1140 identifies a group in the group table 1150 that identifies delegate accounts of the account identified by the account identifier 1132. For example, the delegate group identifier 1140 may identify, for example, the delegates 705 of the user 701.

The account profile table 1130 also includes a plurality of methods $1142_{1\ldots n}$. Each row in the account profile table 1130 may store data defining a account profile object, which encapsulates both data and behavior for a particular account or user of a messaging system (e.g. 240).

The account identifier 1132 uniquely identifies an account. The credentials 1134 store authentication credentials that must be supplied before a session for the account (identified via the account identifier 1132) is established. The subordinate group id 1136 identifiers a group in the group table 1150 that identifies subordinate accounts to the account identified via account id 1132. The peer group id 1138 identifies a group in the group table 1150 that identifies peer accounts to the account identified via account id 1132. The supervisor group id 1139 identifies a group in the group table 1150 that identifies accounts of supervisors of the account identified by the account id 1132. The group ids 1136, 1138, and 1139 may be used by the disclosed embodiments to determine which version of a call user interface is displayed to a user.

Each of the method pointers $1142_{1\ldots n}$ identify one or more methods that implement behavior with respect to the particular account profile.

The group table 1150 includes a group identifier 1152 and an account identifier 1154. The group identifier uniquely identifies a group. The account identifier 1154 identifies an account that is a member of the group identified by the group identifier 1152. Note that an identical value for a group identifier 1132 may appear multiple times in the group table 1150 if there are multiple accounts 1132 in the group 1152. The group table 1150 may be used to identify accounts within one or more groups, such as the groups 420a and 420b, discussed above with respect to user interface 400 in FIG. 4. The group table 1150 may also be used to identify accounts within one or more of the groups 120a-c, discussed above with respect to user interface 100 and FIG. 1.

The call association table 1160 associates one or more calls with a particular account. The call association table 1160 includes an account identifier 1162 and a call object id 1164. Each of the tuples in the call association table 1160 indicates that an account identified by the account identifier 1162 is engaged, in some capacity, with a call identified by the call object identifier 1164. An association between an account and a call may be formed in a variety of scenarios. For example, when a call is received with a called number indicating a phone number associated with a particular account, an association between the account and the call may be formed and recorded in the association table. When a user picks up or barges, whispers, or monitors a call, an association between the user's account and the call may be formed and recorded in the call association table 1160. An association between an account and a call may be deleted when a user associated with the account hangs up the call.

The call association table 1160 may be used to implement the hover interface 510, discussed above. For example, upon hovering over a particular account profile, the call association table 1160 may be queried to identify calls with which the identified account is associated. Each call object may then be invoked to display a call user interface based on access rights of, in the example of FIG. 5, the user 501.

The session table 1170 includes an account identifier 1162 and a session identifier 1164. Upon a successful authentication of an account (e.g. 1132), a session may be established by allocating a new session id 1164 and associating it with the account (e.g. 1162) via the session table. Operations on behalf of users of the messaging system 240 may be performed within the session identified by the session id 1164. The session may inherit access privileges (e.g. 1137) and group membership (e.g. 1160) associated with the account (e.g. 1132).

Figure 12:
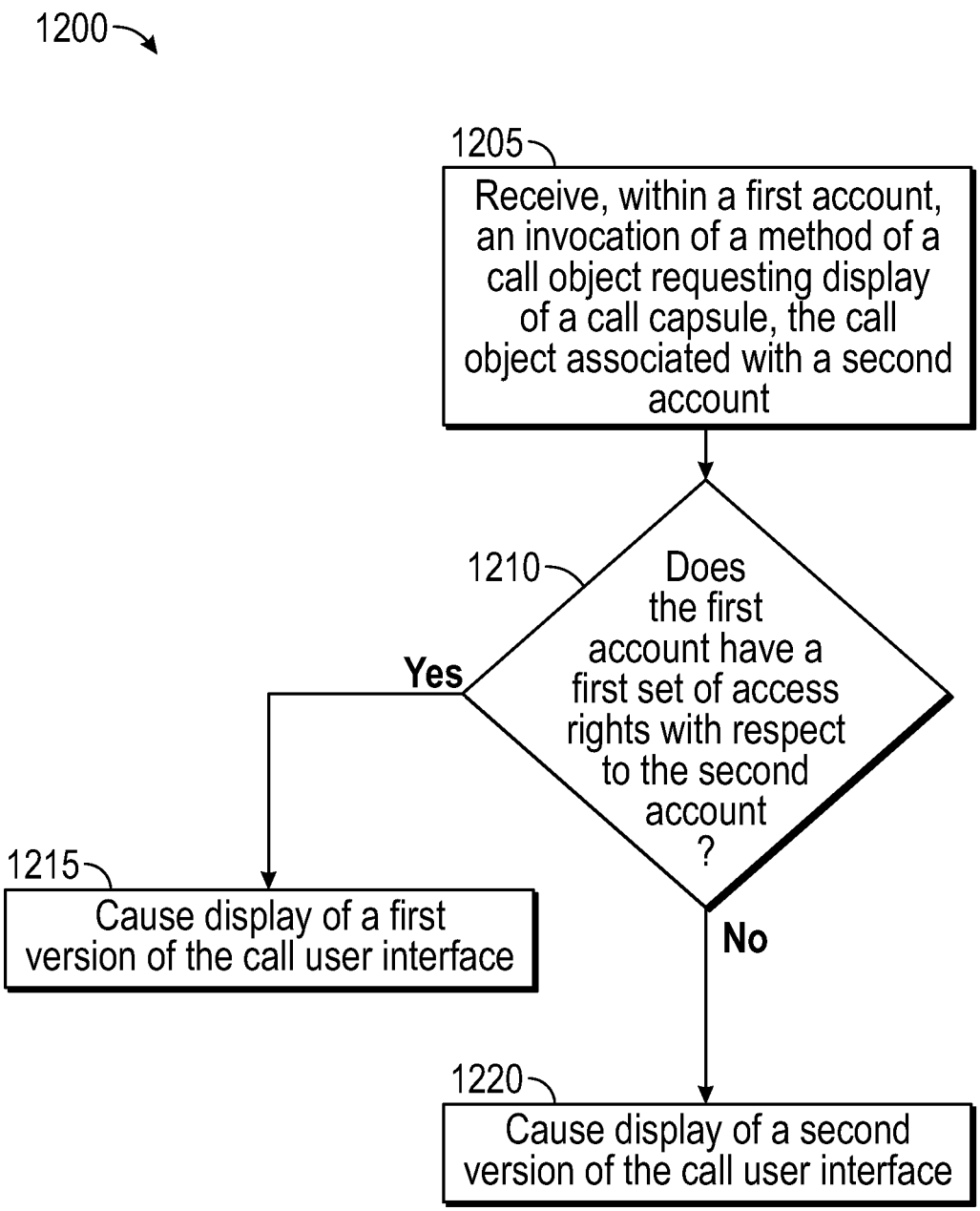
FIG. 12 is a flowchart of an example method for displaying a call user interface.

FIG. 12 is a flowchart of an example method for displaying a call user interface. In some aspects, one or more of the functions discussed below with respect to FIG. 12 may be performed by hardware processing circuitry. For example, instructions stored in a hardware memory may configure hardware processing circuitry to perform one or more of the functions discussed below.

In operation 1205, a method invocation for a call object is received. The method is invoked within a session associated with a first account. In other words, the method is invoked under access rights provided to the first account. One illustrative example of operation 1205 is the messaging system 240, discussed above with respect to FIG. 2, invoking one of the methods 215*b-d* via a reference to a call object (e.g. 202). The messaging system 240 may indirectly invoke, for example, a displayObject( ) method of a call object, when displaying a container including a call object. An example of this is provided above with respect to FIGS. 2B and 2C. The call object is associated with a second account. For example, the call object may be associated with the second account via the call association table 1160 in some aspects.

Decision operation 1210 determines whether the first account has a first set of access rights with respect to the second account. The access rights may relate, for example, to the first account's relationship to the second account. For example, as discussed above with respect to user interface 500 and FIG. 5, the call user interfaces 502*a-c* may only be displayed when a viewing user (e.g. 501) has a particular relationship with a user associated with the calls (e.g. user 520). For other users, e.g. a user represented by card 110*d*, a different display may be provided, such as only a busy or idle indication 510. These access rights may be reflected by data included in an account profile. For example, the access rights 1137 are shown included in each account profile in the account profile table 1130. In some embodiments, decision operation 1210 may consider whether the first account is one or more of a peer account (e.g. 1138), subordinate account (e.g. 1136), supervisor account (e.g. 1139), or delegate account (e.g. 1140) of the second account.

If the first account does have the first set of access rights with respect to the second account, process 1200 moves to block 1215, which causes display of a first version of a call user interface. If the first account does not have the first set of access rights with respect to the second account, process 1200 moves from decision operation 1210 to operation 1220, which causes display of a second version of the call user interface. An example of two different versions of a call user interface are illustrated in FIG. 5. As shown in FIG. 5, the user 501 may have a different set of access rights with respect to the users 520 and 522. Thus, a first call user interface (any of 502*a-c*) is displayed to the user 501 for the user 520, while a second version of a call user interface (e.g. 524) is displayed to the user 501 for the user 522.

Figure 13:
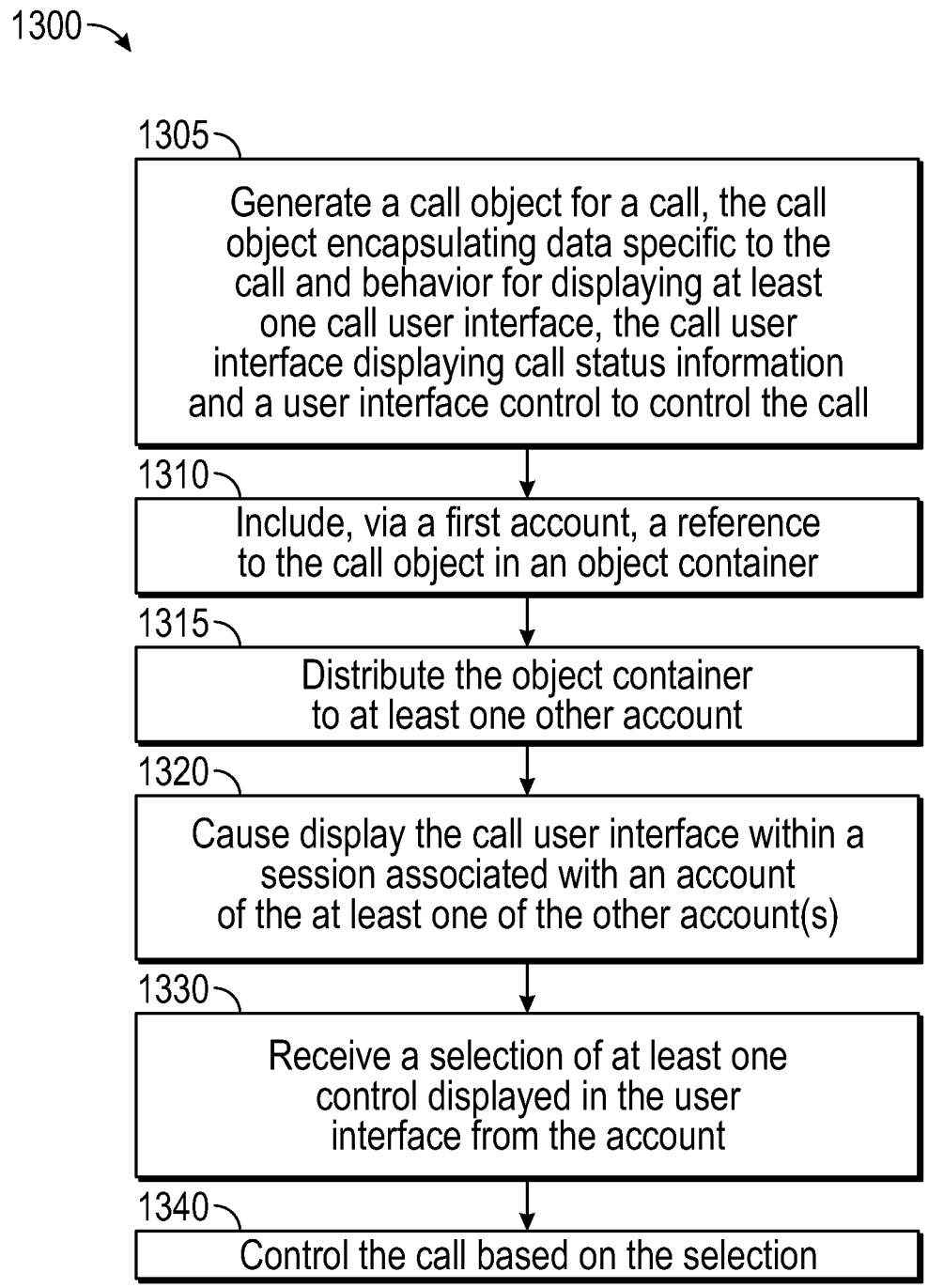
FIG. 13 is a flowchart for a method of sharing call information between multiple users.

FIG. 13 is a flowchart for a method of sharing call information between multiple users. In some aspects, one or more of the functions discussed below with respect to FIG. 13 may be performed by hardware processing circuitry. For example, an electronic hardware memory may store instructions that configure hardware processing circuitry to perform one or more of the functions discussed below with respect to FIG. 13.

In operation 1305, a call object (e.g. 202) is generated for a call. The call object may be generated in response to the messaging system 240 receiving the call from an external network, such as a PBX or IP call network. The call object encapsulates data and behavior specific to the call. For example, the call object may include data defining a caller and/or callee of the call. The object may include data defining one or more input streams for the call and/or one or more output streams for the call. The call object may also encapsulate behavior by including a vtable that includes at least one pointer to a method. The method includes instructions that implement the behavior. At least one behavior encapsulated by the call object is a display of a call user interface. The call user interface includes call status information and/or at least one user interface control that is selectable to control the call. As discussed above, the call status information may indicate a source geographic location of the call, a name of a caller, a phone number or other address associated with the caller, a duration of time the call has been connected, a current status of the call, for example, whether the call is being transferred, is on hold, or is activity connected to at least one user within a messaging system (e.g. 240).

In operation 1310, a reference to the call object is included in an object container via a first account. For example, a user may insert the call object, or a reference to the call object into the container. Operation 1310 may include establishing a first session for the first account. For example, authentication credentials for the first account may be received, and a session established in response to the received authentication credentials matching authentication credentials stored for the first account (e.g. 1134). The first session is then associated with the first account, and may operate under access rights or privileges, and group membership of the first account (e.g. 1137 and/or group memberships defined by the group table 1150).

In operation 1315, the container is distributed to at least one other (e.g. second) account. As discussed above, the object container may be included in a text message, email message, or feed, such as a social network feed or a feed of a messaging system. The text message, or email message may be sent to an address that provides access to the message from the second account. Alternatively, if a feed is used for the distribution, the feed may be accessible by the second account (e.g. the second account may be subscribed to the feed). Operation 1315 may also include establishing a second session for the second account. This may include receiving second authentication credentials from a device and comparing the received credentials with credentials stored for the second account. If the credentials match, the second session is established, and inherits access rights and group membership specified for the second account (e.g. 1137 and/or group memberships defined by group table 1150).

In operation 1320, the call user interface implemented by the call object is caused to be displayed within at least one session associated with a corresponding at least one account that received the object container (e.g. the second account) One or more users subscribed to a feed in which the object container was included could then view the user interface(s) when viewing the feed. Users receiving a text message or email message including the object container would view the user interface when viewing the received text message or email message.

In operation 1330, a selection of at least one control of the call user interface is received from one of the accounts. For example, a user viewing an email, text, or feed that includes the object container may select a control displayed as part of the call user interface, as for example illustrated above.

In operation 1340, the call is controlled based on the selection. As discussed previously, several call operations are possible based on a selection of a UI control displayed within a call user interface. These can include picking up the call, ending the call, forwarding the call, barging the call, or other call operations.

Note that while process 1300 discussed above describes a call object being distributed from a first account to a second account, the process could repeat for additional third, fourth, fifth, or any number of accounts. Each distribution could use email, text, or feed mechanisms to distribute the call object. Additionally, email or text, or feeds could be used to distribute the call object to a plurality of different accounts.

Figure 14:
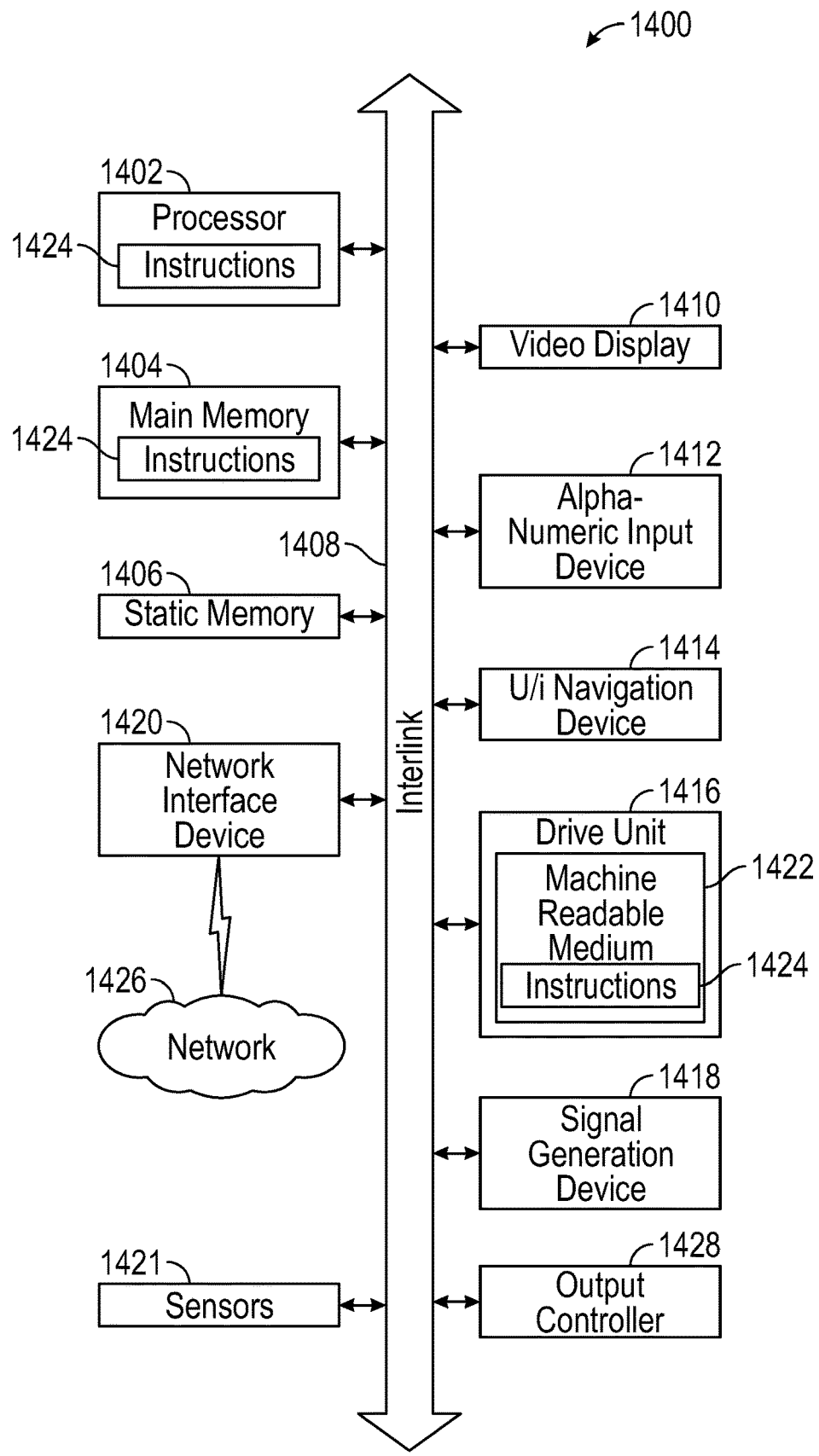
FIG. 14 illustrates a block diagram of an example machine 1400 upon which any one or more of the techniques (e.g., methodologies) discussed herein may perform.

FIG. 14 illustrates a block diagram of an example machine 1400 upon which any one or more of the techniques (e.g., methodologies) discussed herein may perform. In alternative embodiments, the machine 1400 may operate as a standalone device or may be connected (e.g., networked) to other machines. In a networked deployment, the machine 1400 may operate in the capacity of a server machine, a client machine, or both in server-client network environments. In an example, the machine 1400 may act as a peer machine in peer-to-peer (P2P) (or other distributed) network environment. The machine 1300 may be a personal computer (PC), a tablet PC, a set-top box (STB), a personal digital assistant (PDA), a mobile telephone, a smart phone, a web appliance, a network router, switch or bridge, a server computer, a database, conference room equipment, or any machine capable of executing instructions (sequential or otherwise) that specify actions to be taken by that machine. In various embodiments, machine 1400 may perform one or more of the processes described above with respect to FIGS. 1-13. Further, while only a single machine is illustrated, the term "machine" shall also be taken to include any collection of machines that individually or jointly execute a set (or multiple sets) of instructions to perform any one or more of the methodologies discussed herein, such as cloud computing, software as a service (SaaS), other computer cluster configurations.

Examples, as described herein, may include, or may operate on, logic or a number of components, modules, or mechanisms (all referred to hereinafter as "modules"). Modules are tangible entities (e.g., hardware) capable of performing specified operations and may be configured or arranged in a certain manner. In an example, circuits may be arranged (e.g., internally or with respect to external entities such as other circuits) in a specified manner as a module. In an example, the whole or part of one or more computer systems (e.g., a standalone, client or server computer system) or one or more hardware processors may be configured by firmware or software (e.g., instructions, an application portion, or an application) as a module that operates to perform specified operations. In an example, the software may reside on a machine readable medium. In an example, the software, when executed by the underlying hardware of the module, causes the hardware to perform the specified operations.

Accordingly, the term "module" is understood to encompass a tangible entity, be that an entity that is physically constructed, specifically configured (e.g., hardwired), or temporarily (e.g., transitorily) configured (e.g., programmed) to operate in a specified manner or to perform part or all of any operation described herein. Considering examples in which modules are temporarily configured, each of the modules need not be instantiated at any one moment in time. For example, where the modules comprise a general-purpose hardware processor configured using software, the general-purpose hardware processor may be configured as respective different modules at different times. Software may accordingly configure a hardware processor, for example, to constitute a particular module at one instance of time and to constitute a different module at a different instance of time.

Machine (e.g., computer system) 1400 may include a hardware processor 1402 (e.g., a central processing unit (CPU), a graphics processing unit (GPU), a hardware processor core, or any combination thereof), a main memory 1404 and a static memory 1406, some or all of which may communicate with each other via an interlink (e.g., bus) 1408. The machine 1400 may further include a display unit 1410, an alphanumeric input device 1412 (e.g., a keyboard), and a user interface (UI) navigation device 1414 (e.g., a mouse). In an example, the display unit 1410, input device 1412 and UI navigation device 1414 may be a touch screen display. The machine 1400 may additionally include a storage device (e.g., drive unit) 1416, a signal generation device 1418 (e.g., a speaker), a network interface device 1420, and one or more sensors 1421, such as a global positioning system (GPS) sensor, compass, accelerometer, or other sensor. The machine 1400 may include an output controller 1428, such as a serial (e.g., universal serial bus (USB), parallel, or other wired or wireless (e.g., infrared (IR), near field communication (NFC), etc.) connection to communicate or control one or more peripheral devices (e.g., a printer, card reader, etc.).

The storage device 1416 may include a machine readable medium 1422 on which is stored one or more sets of data structures or instructions 1424 (e.g., software) embodying or utilized by any one or more of the techniques or functions described herein. The instructions 1424 may also reside, completely or at least partially, within the main memory 1404, within static memory 1406, or within the hardware processor 1402 during execution thereof by the machine 1400. In an example, one or any combination of the hardware processor 1402, the main memory 1404, the static memory 1406, or the storage device 1416 may constitute machine readable media.

While the machine readable medium 1422 is illustrated as a single medium, the term "machine readable medium" may include a single medium or multiple media (e.g., a centralized or distributed database, and/or associated caches and servers) configured to store the one or more instructions 1424.

The term "machine readable medium" may include any medium that is capable of storing, encoding, or carrying instructions for execution by the machine 1400 and that cause the machine 1400 to perform any one or more of the techniques of the present disclosure, or that is capable of storing, encoding or carrying data structures used by or associated with such instructions. Non-limiting machine readable medium examples may include solid-state memories, and optical and magnetic media. Specific examples of machine readable media may include: non-volatile memory, such as semiconductor memory devices (e.g., Electrically Programmable Read-Only Memory (EPROM), Electrically Erasable Programmable Read-Only Memory (EEPROM)) and flash memory devices; magnetic disks, such as internal hard disks and removable disks; magneto-optical disks; Random Access Memory (RAM); Solid State Drives (SSD); and CD-ROM and DVD-ROM disks. In some examples, machine readable media may include non-transitory machine readable media. In some examples, machine readable media may include machine readable media that is not a transitory propagating signal.

The instructions 1424 may further be transmitted or received over a communications network 1426 using a transmission medium via the network interface device 1420. The machine 1400 may communicate with one or more other machines utilizing any one of a number of transfer protocols (e.g., frame relay, internet protocol (IP), transmission control protocol (TCP), user datagram protocol (UDP), hypertext transfer protocol (HTTP), etc.). Example communication networks may include a local area network (LAN), a wide area network (WAN), a packet data network (e.g., the Internet), mobile telephone networks (e.g., cellular networks), Plain Old Telephone (POTS) networks, and wireless data networks (e.g., Institute of Electrical and Electronics Engineers (IEEE) 802.11 family of standards known as Wi-Fi®, IEEE 802.16 family of standards known as WiMax®), IEEE 802.15.4 family of standards, a Long Term Evolution (LTE) family of standards, a Universal Mobile Telecommunications System (UMTS) family of standards, peer-to-peer (P2P) networks, among others. In an example, the network interface device 1420 may include one or more physical jacks (e.g., Ethernet, coaxial, or phone jacks) or one or more antennas to connect to the communications network 1426. In an example, the network interface device 1420 may include a plurality of antennas to wirelessly communicate using at least one of single-input multiple-output (SIMO), multiple-input multiple-output (MIMO), or multiple-input single-output (MISO) techniques. In some examples, the network interface device 1420 may wirelessly communicate using Multiple User MIMO techniques.

Examples, as described herein, may include, or may operate on, logic or a number of components, modules, or mechanisms. Modules are tangible entities (e.g., hardware) capable of performing specified operations and may be configured or arranged in a certain manner. In an example, circuits may be arranged (e.g., internally or with respect to external entities such as other circuits) in a specified manner as a module. In an example, the whole or part of one or more computer systems (e.g., a standalone, client, or server computer system) or one or more hardware processors may be configured by firmware or software (e.g., instructions, an application portion, or an application) as a module that operates to perform specified operations. In an example, the software may reside on a machine-readable medium. In an example, the software, when executed by the underlying hardware of the module, causes the hardware to perform the specified operations.

Example 1 is a system comprising: hardware processing circuitry; a hardware memory comprising instructions that when executed by the hardware processing circuitry, control the system to implement: a plurality of call objects, each call object encapsulating information relating to an active call, each call object configured to display a call user interface, the call user interface including information relating to its respective call including call status information, and the call user interface further configured to display at least one control configured to, upon selection, control the call based on one or more access privileges of an account session displaying the call user interface, wherein the control of the call includes at least one of forwarding the call or picking up the call; and a messaging system configured to provide messaging between a plurality of accounts, the messaging system configured to distribute references to one or more of the plurality of call objects to at least some of the plurality of accounts, and to cause display of the call user interface within at least one of the plurality of accounts, and is further configured to receive input selecting at least one of the controls of the call user interface, and to communicate the selection to the respective call object.

In Example 2, the subject matter of Example 1 optionally includes wherein the messaging system is configured to receive a drag operation within a particular account, the drag operation identifying a particular call object in the call object collection and a drop operation dropping the particular call object onto an object container.

In Example 3, the subject matter of Example 2 optionally includes wherein the object container is a body of a message, and wherein the messaging system is configured to send the message to a recipient user, and display the message within a recipient account of the recipient user, the display of the message including a display of a call user interface for the particular call object.

In Example 4, the subject matter of Example 3 optionally includes wherein the particular call object is configured to receive a selection of a user interface control displayed within the call user interface and to control the call based on the selection.

In Example 5, the subject matter of any one or more of Examples 2-4 optionally include wherein the object container is a feed, and wherein the messaging system is configured to display a call user interface for the particular call object within a plurality of accounts displaying the feed.

In Example 6, the subject matter of Example 5 optionally includes wherein the particular call object is configured to receive a selection of one of the at least one controls from within one of the plurality of accounts displaying the feed, the one control configured to pick-up the call on behalf of the one account.

In Example 7, the subject matter of any one or more of Examples 2-6 optionally include a plurality of account profile objects, each account profile object encapsulating data for a unique user account of the messaging system, each account profile object configured to display, within a viewing user account, call status for the respective unique user account based on one or more access privileges of the viewing user account with respect to the unique user account.

In Example 8, the subject matter of Example 7 optionally includes wherein at least one account profile object comprises a collection storing references to one or more call objects representing calls associated with its unique user, and is configured to display, within the viewing user account, a call user interface for each of the one or more call objects based on the one or more access privileges of the viewing user account.

In Example 9, the subject matter of any one or more of Examples 1-8 optionally include wherein the call object collection is configured to store the call objects in a queue, and to display statistics for the queue.

Example 10 is a method, comprising generating a call object for a call, the call object encapsulating data specific to the call and behavior for displaying at least one call user interface, the call user interface displaying call status information and a user interface control to control the call; establishing a first session based on authentication credentials of a first account; adding, within the first session, a reference to the call object to an object container; providing access to the object container to a second account; establishing a second session based on authentication credentials of the second account; and causing display at least one of the call user interfaces within the second session in response to a display of the object container within the second session.

In Example 11, the subject matter of Example 10 optionally includes wherein providing access to the object container to the second account comprises including the object container in a message, and sending the message to the second account.

In Example 12, the subject matter of any one or more of Examples 10-11 optionally include wherein providing access to the object container to the second account comprises including the object container in a feed, and displaying the feed within the second session.

In Example 13, the subject matter of any one or more of Examples 10-12 optionally include displaying, within the first session, a second call user interface for the call object, receiving, within the first session, a drag operation of the second call user interface and a drop operation on the second call user interface, and adding the reference to the call object to the object container in response to the drag and drop operation.

In Example 14, the subject matter of any one or more of Examples 10-13 optionally include wherein the display of the at least one call user interface within the second session comprises displaying a user interface control configured to transfer or pick up the call upon selection of the user interface control.

In Example 15, the subject matter of Example 14 optionally includes wherein the display of the at least one call user interface comprises displaying call status information within the at least one call user interface.

In Example 16, the subject matter of any one or more of Examples 10-15 optionally include receiving, within the second session, a drag operation on the at least one call user interface, and a drop operation of the at least one call user interface within a second object container, providing access to the second object container to a third account, establishing a third session based on third authentication credentials of a third account, and causing display of the at least one call user interface within the third session in response to the providing of access.

Example 17 is an apparatus, comprising means for generating a call object for a call, the call object encapsulating data specific to the call and behavior for displaying at least one call user interface, the call user interface displaying call status information and a user interface control to control the call; means for establishing a first session based on authentication credentials of a first account; means for adding, within the first session, a reference to the call object to an object container; means for providing access to the object container to a second account; means for establishing a second session based on authentication credentials of the second account; and means for causing display at least one of the call user interfaces within the second session in response to a display of the object container within the second session.

In Example 18, the subject matter of any one or more of Examples 10-17 optionally include wherein the means for providing access to the object container to the second account is configured to include the object container in a message, and sending the message to the second account.

In Example 19, the subject matter of any one or more of Examples 10-18 optionally include wherein the means for providing access to the object container to the second account is configured to include the object container in a feed, and displaying the feed within the second session.

In Example 20, the subject matter of any one or more of Examples 10-19 optionally include means for causing display, within the first session, of a second call user interface for the call object, means for receiving, within the first session, a drag operation of the second call user interface and a drop operation on the second call user interface, and means for adding the reference to the call object to the object container in response to the drag and drop operation.

Accordingly, the term "module" is understood to encompass a tangible entity, be that an entity that is physically constructed, specifically configured (e.g., hardwired), or temporarily (e.g., transitorily) configured (e.g., programmed) to operate in a specified manner or to perform part or all of any operation described herein. Considering examples in which modules are temporarily configured, each of the modules need not be instantiated at any one moment in time. For example, where the modules comprise a general-purpose hardware processor configured using software, the general-purpose hardware processor may be configured as respective different modules at different times. Software may accordingly configure a hardware processor, for example, to constitute a particular module at one instance of time and to constitute a different module at a different instance of time.

Various embodiments may be implemented fully or partially in software and/or firmware. This software and/or firmware may take the form of instructions contained in or on a non-transitory computer-readable storage medium. Those instructions may then be read and executed by one or more processors to enable performance of the operations described herein. The instructions may be in any suitable form, such as but not limited to source code, compiled code, interpreted code, executable code, static code, dynamic code, and the like. Such a computer-readable medium may include any tangible non-transitory medium for storing information in a form readable by one or more computers, such as but not limited to read only memory (ROM); random access memory (RAM); magnetic disk storage media; optical storage media; flash memory; etc.

We claim:

1. A system for dynamically sharing call related information for received calls across a plurality of users of a messaging service, the system comprising:
   hardware processing circuitry;
   a hardware memory comprising instructions that when executed by the hardware processing circuitry, control the system to perform operations comprising:
   receiving a call from a user not in the plurality of users of the messaging service;
   generating a call object for the call, the call object encapsulating data specific to the call and instructions for displaying a call user interface, the call user interface configured to display call status information and provide a user interface control to control the call;

establishing a first session of the messaging service based on authentication credentials of a first account associated with a first user of the plurality of users of the messaging service;

adding, within the first session, a reference to the call object for the call to an object container;

providing access through the messaging service to the object container to a second account associated with a second user of the plurality of users of the messaging service;

in response to providing the access through the messaging service to the object container to the second account, establishing a second session of the messaging service based on authentication credentials of the second account; and causing display of the call user interface including the user interface control to control the call within the second session in response to establishing the second session.

2. The system of claim 1, wherein the operations further comprise receiving a drag operation within the first account, the drag operation identifying the call object and a drop operation dropping the call object onto the object container.

3. The system of claim 2, wherein the object container is a body of a message, and wherein providing access through the messaging service to the object container comprises sending the message to the second user, and displaying the message within the second account of the second user, the display of the message including a display of a call user interface for the call object.

4. The system of claim 3, wherein the call object is configured to receive a selection of a user interface control displayed within the call user interface and to control the call based on the selection.

5. The system of claim 2, wherein the object container is a feed, and wherein providing access through the messaging service to the object container comprises displaying a call user interface for the call object within a plurality of accounts including the second account displaying the feed.

6. The system of claim 5, wherein the call object is configured to receive a selection of one of the at least one controls from the second account, the one control configured to pickup the call on behalf of the second account.

7. The system of claim 2, further comprising a plurality of account profile objects, each account profile object encapsulating data for a unique user account of the messaging service, each account profile object configured to display, within a viewing user account, call status for the respective unique user account based on one or more access privileges of the viewing user account with respect to the unique user account.

8. The system of claim 1, wherein an end-to-end connection for the call is maintained from receiving the call through establishing the second session of the messaging service.

9. A method for dynamically sharing call related information for received calls across a plurality of users of a messaging service, the method comprising:

receiving a call from a user not in the plurality of users of the messaging service;

generating a call object for the call, the call object encapsulating data specific to the call and instructions for displaying a call user interface, the call user interface configured to display call status information and provide a user interface control to control the call;

establishing a first session of the messaging service based on authentication credentials of a first account associated with a first user of the plurality of users of the messaging service;

adding, within the first session, a reference to the call object for the call to an object container;

providing access through the messaging service to the object container to a second account associated with a second user of the plurality of users of the messaging service;

in response to providing the access through the messaging service to the object container to the second account, establishing a second session of the messaging service based on authentication credentials of the second account; and causing display of the call user interface including the user interface control to control the call within the second session in response to establishing the second session.

10. The method of claim 9, wherein providing access to the object container to the second account comprises including the object container in a message, and sending the message to the second account.

11. The method of claim 10, wherein the display of the at least one call user interface within the second session comprises displaying a user interface control configured to transfer or pick up the call upon selection of the user interface control.

12. The method of claim 11, wherein the display of the at least one call user interface comprises displaying call status information within the at least one call user interface.

13. The method of claim 9, wherein providing access to the object container to the second account comprises including the object container in a feed, and displaying the feed within the second session.

14. The method of claim 9, further comprising displaying, within the first session, a second call user interface for the call object, receiving, within the first session, a drag operation of the second call user interface and a drop operation on the second call user interface, and adding the reference to the call object to the object container in response to the drag and drop operation.

15. The method of claim 9, further comprising receiving, within the second session, a drag operation on the at least one call user interface, and a drop operation of the at least one call user interface within a second object container, providing access to the second object container to a third account, establishing a third session based on third authentication credentials of a third account, and causing display of the at least one call user interface within the third session in response to the providing of access.

16. The method of claim 15, wherein the drop operation is configured to add a reference to a call object displaying the at least one call user interface to the second object container.

17. An apparatus for dynamically sharing call related information for received calls across a plurality of users of a messaging service, the apparatus comprising:

means for receiving a call from a user not in the plurality of users of the messaging service;

means for generating a call object for the call, the call object encapsulating data specific to the call and instructions for displaying a call user interface, the call user interface configured to display call status information and provide a user interface control to control the call;

means for establishing a first session of the messaging service based on authentication credentials of a first account associated with a first user of the plurality of users of the messaging service;

means for adding, within the first session, a reference to the call object for the call to an object container;

means for providing access through the messaging service to the object container to a second account associated with a second user of the plurality of users of the messaging service;

in response to providing the access through the messaging service to the object container to the second account, means for establishing a second session of the messaging service based on authentication credentials of the second account; and means for causing display of the call user interface including the user interface control to control the call within the second session in response to establishing the second session.

18. The apparatus of claim 17, wherein the means for providing access to the object container to the second account is configured to include the object container in a message, and sending the message to the second account.

19. The apparatus of claim 17, wherein the means for providing access to the object container to the second account is configured to include the object container in a feed, and displaying the feed within the second session.

20. The apparatus of claim 17, further comprising means for causing display, within the first session, of a second call user interface for the call object, means for receiving, within the first session, a drag operation of the second call user interface and a drop operation on the second call user interface, and means for adding the reference to the call object to the object container in response to the drag and drop operation.

* * * * *